US010595105B2

(12) United States Patent
Amae

(10) Patent No.: US 10,595,105 B2
(45) Date of Patent: Mar. 17, 2020

(54) UNIT BODY HOUSING IN A SPEAKER SYSTEM

(71) Applicant: Logitech Europe S.A., Lausanne (CH)

(72) Inventor: Dominic Amae, Vancouver, WA (US)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 15/494,233

(22) Filed: Apr. 21, 2017

(65) Prior Publication Data

US 2018/0310082 A1 Oct. 25, 2018

(51) Int. Cl.
| | |
|---|---|
| *H04R 9/06* | (2006.01) |
| *H04R 1/02* | (2006.01) |
| *H04R 31/00* | (2006.01) |
| *B29C 45/16* | (2006.01) |
| *H04R 7/20* | (2006.01) |
| *B29K 69/00* | (2006.01) |
| *B29K 75/00* | (2006.01) |
| *B29K 83/00* | (2006.01) |
| *B29L 31/34* | (2006.01) |

(52) U.S. Cl.
CPC ......... *H04R 1/021* (2013.01); *B29C 45/1671* (2013.01); *H04R 31/003* (2013.01); *B29C 2045/1673* (2013.01); *B29K 2069/00* (2013.01); *B29K 2075/00* (2013.01); *B29K 2083/005* (2013.01); *B29L 2031/3418* (2013.01); *H04R 7/20* (2013.01)

(58) Field of Classification Search
CPC . H04R 1/02; H04R 1/021; H04R 7/16; H04R 7/18; H04R 7/20; H04R 31/003; H04R 1/2834; H04R 1/283; H04R 1/2896; H04R 1/2892; H04R 2400/11

USPC ....... 381/336, 332, 386, 182, 398, 334, 335; 29/594; 181/171–172

See application file for complete search history.

(56) References Cited

U.S. PATENT DOCUMENTS

| | | | | |
|---|---|---|---|---|
| 4,146,744 A | * | 3/1979 | Veranth ................ | H04R 1/2819 181/146 |
| 7,676,054 B2 | * | 3/2010 | Setiabudi ................. | H04R 5/02 381/423 |
| 7,957,550 B2 | * | 6/2011 | Jih-Fon ................. | G06F 1/1626 381/332 |
| 8,019,108 B2 | * | 9/2011 | Hayashi ............... | H04R 1/2834 181/156 |

(Continued)

*Primary Examiner* — Xu Mei
(74) *Attorney, Agent, or Firm* — Kilpatrick Townsend & Stockton LLP

(57) ABSTRACT

Certain embodiments include an injection-molded portable speaker apparatus including a portable speaker housing with an opening formed on the surface, a flexible inverted speaker surround including an inner perimeter and an outer perimeter, where the outer perimeter is coupled to an outer edge of the opening of the housing, and a diaphragm coupled to the inner perimeter of the flexible surround such that the diaphragm is suspended within the opening of the housing, where the flexible surround and diaphragm form a speaker passive, and where the speaker housing and the flexible surround form a continuous unitized body. The injection molding process for the continuous unitized body can be a two-shot process, where the first shot forms the speaker housing, and the second shot forms the flexible surround, which may further over-mold the diaphragm, such that the diaphragm is part of the continuous unitized body.

6 Claims, 18 Drawing Sheets

(56) References Cited

U.S. PATENT DOCUMENTS

| | | | |
|---|---|---|---|
| 8,798,308 B2* | 8/2014 | Litovsky | H04R 1/2834 381/164 |
| 9,282,407 B2* | 3/2016 | Kim | H04R 3/12 |
| 9,462,361 B2* | 10/2016 | Amae | H04R 1/02 |
| 2013/0156218 A1* | 6/2013 | Annacone | B29C 45/1676 381/87 |
| 2014/0112516 A1* | 4/2014 | Jiles | H04R 1/083 381/361 |
| 2015/0195629 A1* | 7/2015 | Sumitani | H04R 7/04 381/191 |
| 2015/0245122 A1* | 8/2015 | Rayner | H04R 1/2834 381/152 |
| 2016/0080845 A1* | 3/2016 | Williams | H04R 1/02 381/386 |

* cited by examiner

⑦b part ejection, preferrably with robot

UNIT BODY HOUSING IN A SPEAKER SYSTEM

BACKGROUND

Consumer-grade mobile wireless speakers have undergone significant improvements over the years. Many modern designs have smaller, more compact designs with longer battery life, good fidelity, and attractive aesthetic designs in an assortment of shapes, sizes, and colors that appeal to a wide variety of consumers. Achieving better acoustic efficiency, e.g., performance per size, can provide a competitive advantage for portable speakers. However, smaller enclosures and tighter constraints are often associated with engineering tradeoffs, such as a reduced bass response, higher failure rates, wider component tolerances and wider performance yield distributions. Better wireless speakers are needed that can maintain the convenience of a compact design and provide superior performance and yield characteristics.

BRIEF SUMMARY

Aspects of the invention can include a portable speaker apparatus comprising a speaker housing having a surface, the speaker housing including an opening formed on the surface of the housing, a flexible surround including an inner circumference and an outer circumference, the outer circumference coupled to an outer edge of the opening of the speaker housing, and a diaphragm coupled to the inner circumference of the flexible surround such that the diaphragm is suspended within the opening of the speaker housing, where the flexible surround and diaphragm form a speaker passive, and where the speaker housing and the flexible surround form a continuous unitized body. In some cases, the flexible surround can be an inverted surround, which can be comprised of liquid silicone rubber (LSR) or thermoplastic polyurethane (TPU). The speaker housing can be comprised of a polycarbonate (PC). In some cases, the inner and outer circumference may be referred to as an inner and outer perimeter, which may depend on the shape of the flexible element (e.g., flexible surround). For instance, it may be appropriate to refer to a flexible element with a round, oval-shape, or rectangle with rounded edges as having a "circumference." With shapes that are more angular (e.g., differ from rounded shapes), it may be more appropriate to use the term "perimeter" rather than "circumference." Either term can be used and one term should not be considered to be more limiting or broader than the other. One of ordinary skill in the art would understand the non-limiting distinction. It should be understood that the use of interchangeable terms "circumference" and "perimeter" may be applied in a similar manner throughout this document.

In certain embodiments, the continuous unitized body can be injection molded. In some cases, the injection molding can be a multi-shot process, where a first shot of the multi-shot process forms the speaker housing, and where a second shot of the multi-shot process forms the flexible surround and over-molds the diaphragm, such that the diaphragm is part of the continuous unitized body. The housing can be formed in one of a cylindrical shape, rectangular shape, square shape, oval shape, pill shape, saucer shape, spherical shape, or any suitable volume.

In some embodiments, an apparatus includes a housing having a surface, the housing including an opening formed on the surface of the housing, a flexible connector including an inner circumference and an outer circumference, the outer circumference coupled to an outer edge of the opening of the housing, and a suspended element coupled to the inner circumference of the flexible connector such that the suspended element is suspended within the opening of the housing, where the housing and the flexible connector form a continuous unitized body. In some implementations, the flexible connector can be an inverted surround. The flexible connector can be comprised of LSR or TPU, and the housing may be comprised of a PC.

In certain embodiments, the continuous unitized body can be injection molded. The injection molding can be a multi-shot process, where a first shot of the multi-shot process forms the housing, and where a second shot of the multi-shot process forms the flexible connector and over-molds the suspended element, such that the suspended element forms a part of the continuous unitized body. The first shot of the injection mold can be comprised of a PC, and the second shot of the injection mold can be comprised of LSR or TPU.

In further embodiments, a method of forming a mobile speaker apparatus using an injection molding process includes performing a first shot in the injection molding process, the first shot forming a hollow speaker housing including an opening formed on a surface of the speaker housing, and performing a second shot in the injection molding process, the second shot forming an inverted speaker surround including an inner perimeter and an outer perimeter. In some aspects, outer perimeter can be coupled to an outer edge of the opening of the speaker housing. The hollow speaker housing and the inverted speaker surround may form a continuous unitized body. The first shot may include a PC and the second shot may include LSR or TPU.

In some implementations, the method further includes placing a speaker diaphragm in the opening formed on the surface of the hollow speaker housing after the first shot and before the second shot, where the speaker diaphragm is secured to the inner perimeter of the inverted speaker surround by the second shot. The second shot can further over-mold the speaker diaphragm such that the diaphragm forms a portion of the continuous unitized body.

In some cases, a shape and internal dimensions of the hollow speaker housing, the speaker opening, and the inverted speaker surround are defined, in part, by a tooling plate core, where the inverted speaker surround extends below a portion of a surface of the tooling plate core that defines the speaker housing, and where the method can further include applying a force to cause the diaphragm and inverted speaker surround to extend radially outward from the surface of the speaker housing such that the inverted speaker surround and the diaphragm are above a bottom surface of the speaker housing and removing the tooling plate core from the mobile speaker apparatus. In some implementations, applying the force may include at least one of latching on to the diaphragm via a vacuum attachment and providing a pulling force to extend the diaphragm and inverted speaker surround above the bottom surface of the speaker housing, or applying a gas pressure from the tooling plate core to provide a pushing force to extend the diaphragm and inverted speaker surround above the bottom surface of the speaker housing.

BRIEF DESCRIPTION OF THE DRAWINGS

FIG. 10 shows aspects of a method of injection molding a speaker housing having a continuous unitized body construction, according to certain embodiments.

FIG. 11 shows aspects of a method of injection molding a speaker housing having a continuous unitized body construction, according to certain embodiments.

DETAILED DESCRIPTION

Aspects of the present disclosure relate generally to acoustic systems, and in particular to a mobile speaker system having a housing and passive radiator formed as a continuous, unitized body, according to certain embodiments.

In the following description, various embodiments of audio device housings with an integrated and continuous, unitary passive radiator will be described. For purposes of explanation, specific configurations and details are set forth in order to provide a thorough understanding of the embodiments. However, it will be apparent to one skilled in the art that certain embodiments may be practiced without every disclosed detail. Furthermore, well-known features may be omitted or simplified in order not to obscure the novel features described herein.

Certain embodiments of the invention relate to a speaker housing having a continuous, unitized body ("unit body" or "unitary body"). For example, an injection-molded portable speaker apparatus may include a portable speaker housing with an opening formed on the surface, a flexible inverted speaker surround, and a diaphragm coupled to the flexible inverted speaker surround and suspended in the opening of the housing, where the speaker housing, inverted speaker surround, and diaphragm form a continuous, unitized body, as described below with respect to FIGS. 7-8. In some cases, the flexible inverted speaker surround includes an inner circumference and an outer circumference, where the outer circumference can be coupled to an outer edge of the opening of the housing, and the diaphragm can be coupled to the inner circumference of the flexible surround such that the diaphragm is suspended within the opening of the housing. The flexible surround and diaphragm can form a speaker passive.

In some embodiments, the manufacturing process for the continuous unitized body can include a two-shot injection molding process, where the first shot forms the speaker housing, and the second shot forms the inverted flexible surround, which may further over-mold a diaphragm, such that the diaphragm is part of the continuous unitized body. The implementation of an inverted flexible surround can be advantageous because it allows the speaker passive assembly (e.g., combination of the speaker surround and diaphragm) to be pulled away from the center tooling core such that the core is unobstructed as it is removed from the speaker housing, as further discussed below with respect to FIGS. 10-21.

Conventional Mobile Audio Output Devices

Figure 1:
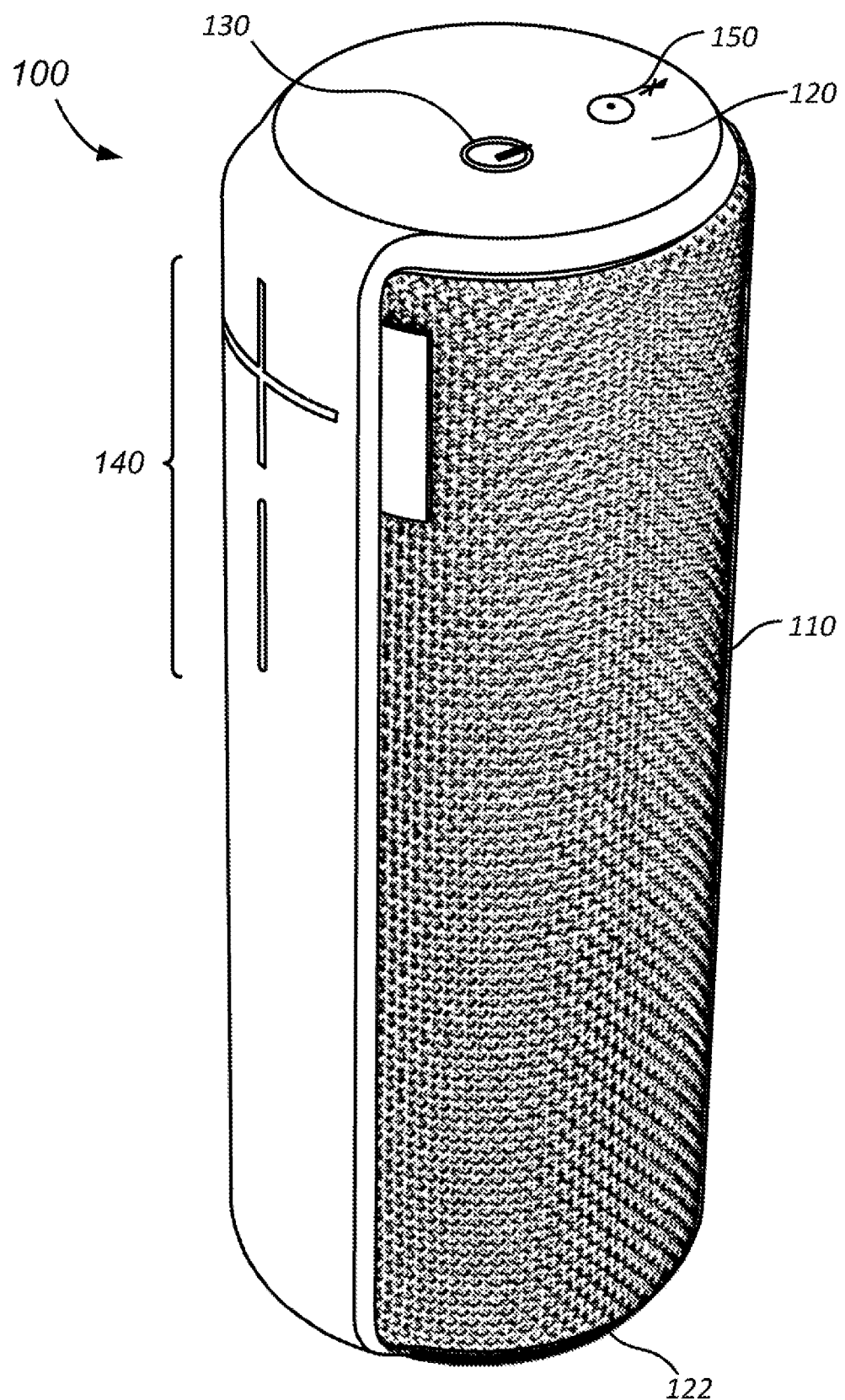
FIG. 1 shows aspects of a mobile audio device, according to certain embodiments.
Figure 2:
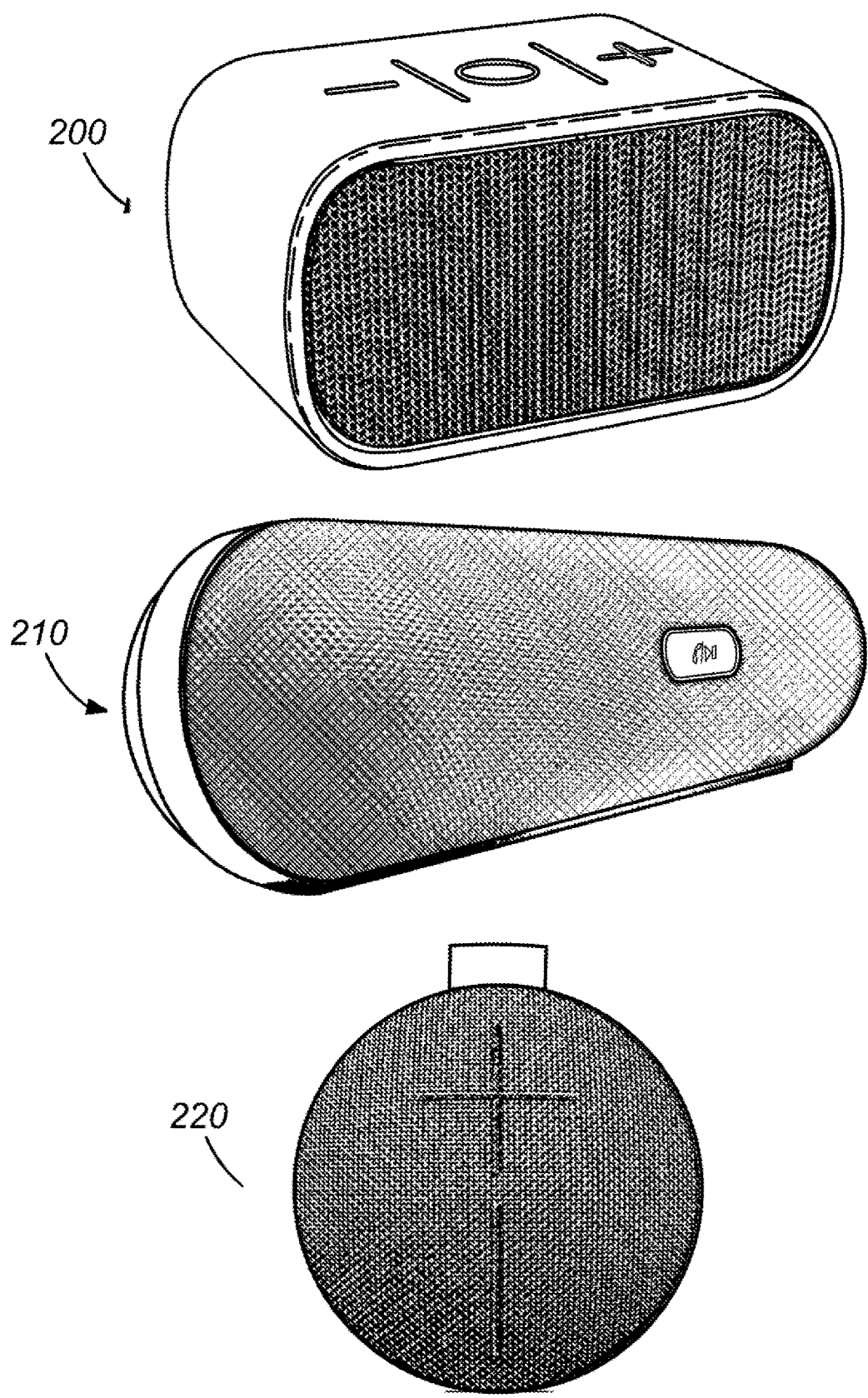
FIG. 2 shows a number of mobile audio devices having alternative form factors, according to certain embodiments.

FIG. 1 shows a mobile audio device 100, according to certain embodiments. Mobile audio device ("audio device") 100 can be a portable wireless speaker in any suitable shape (e.g., cylinder) that can include housing/grille 110, end caps 120, 122, power button 130, volume controls 140, wireless communication button 150, or other suitable features (e.g., input/output data ports, charging ports (e.g., USB, micro-USB, LEDs, etc.), as would be understood by one of ordinary skill in the art. Audio device 100 can utilize any suitable wireless communication protocol including, but not limited to, Bluetooth®, Bluetooth Low Energy (BLE), infrared (IR), Z-Wave, ZigBee, Wi-Fi (e.g., IEEE 802.11), Near Field Communication (NFC), or the like. Audio device 100 can be manufactured having any size or dimension and may include one or more active drivers and passive radiators (not shown). Some embodiments employ a rugged construction that is capable of withstanding significant impacts while remaining fully functional, airtight, water proof (e.g., per IPx7 specifications). Typical embodiments may generate an audio output rated at 90 dBa with a frequency range of 90 Hz to 20 kHz, although other embodiments may have different performance specifications. Audio device 100 may use rechargeable batteries (e.g., lithium-ion) that can be recharged via USB, mini-USB, micro-USB, USB Type C, or other suitable hard-wired or wireless charging protocol. In some embodiments, audio device 100 (and any of the embodiments described in this disclosure) can be controlled by system 2400 or FIG. 24. Mobile audio output device 100 may alternatively be referred to herein as an audio device, mobile audio device, mobile output device, portable or mobile speaker apparatus, speaker system, audio system, or the like. Although aspects of a particular type of cylindrical audio device housing is described herein, one of ordinary skill in the art would understand that the methods and concepts described and anticipated herein are not limited thereto and can be applied to any suitable shape, including a rectangle, square, oval, pill shape, saucer shape, sphere, or other suitable polygon. Some alternative audio device form factors (i.e., audio device 200-220) are shown in FIG. 2.

Figure 3:
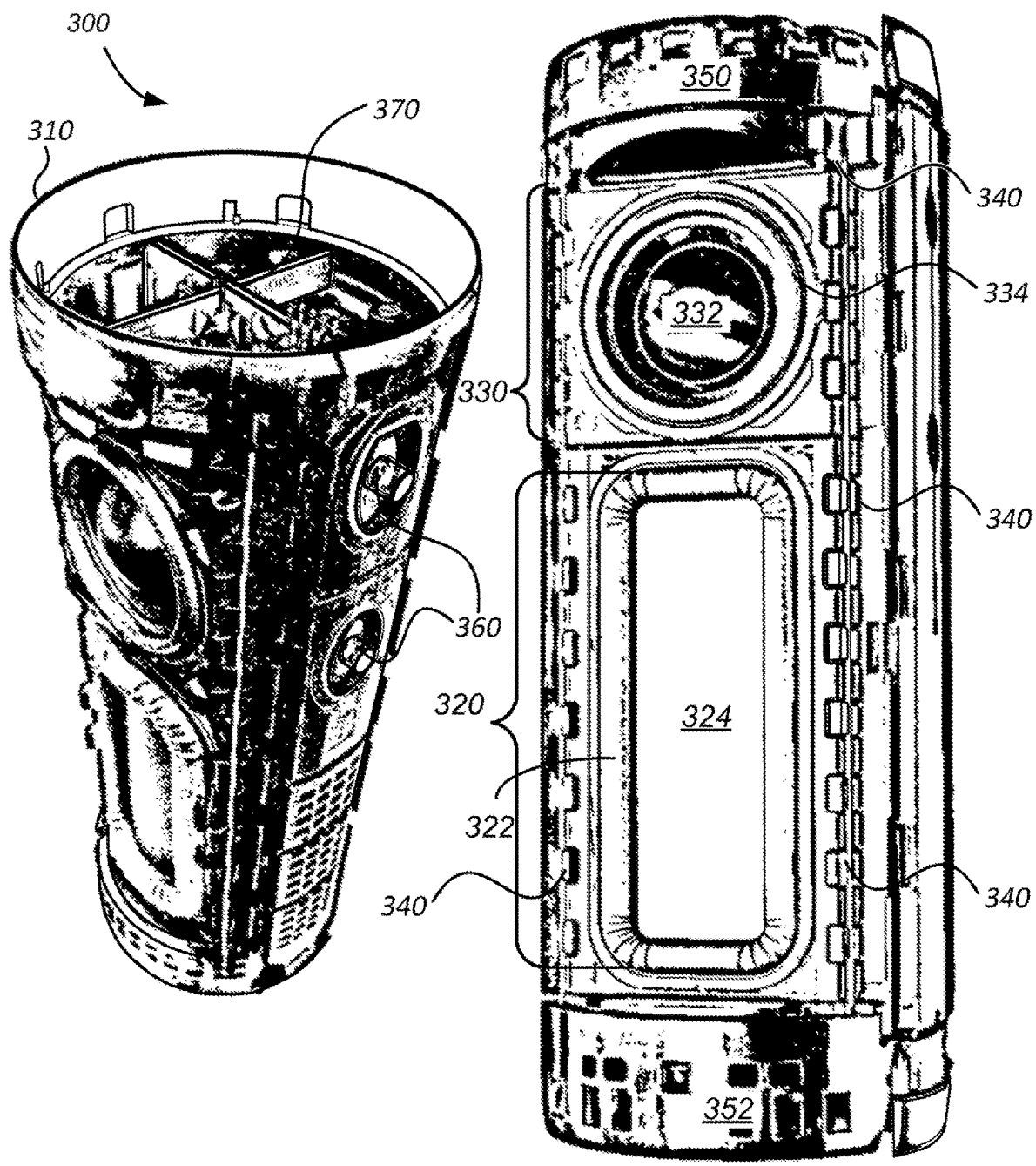
FIG. 3 shows a partially disassembled conventional view of a mobile audio device.

FIG. 3 shows a partially disassembled conventional mobile audio device 300. Mobile audio device 300 can include housing 310(a, b), one or more passive radiator 320 (i.e., passive speaker), one or more active drivers 330, speaker components (e.g., voice coil, magnet, etc.—not shown), one or more speaker fasteners 340, housing end caps 350, 352, buttons/controls (e.g., volume, on/off, etc.) 360, printed circuit board(s) (PCB) 370, charging/data port(s) (not shown), and energy storage device(s) (not shown), among other common features.

Housing 310 typically functions as a frame and houses all of the main components in the mobile audio output device (e.g., speakers, electronics, acoustic chambers, etc.). Housing 310, in conventional devices, can be die cast, injection molded, stamped, machined, 3D printed, etc., and may be formed of multiple pieces (e.g., two halves coupled together during manufacturing). Referring to FIG. 3, housing 310 is formed of two halves. Housing 310 can be rugged and provides the structure and shape of the mobile audio device. Some embodiments may include housing end caps 350, 352.

Speaker(s) can include passive and/or active speakers. Active driver 330 may include surround 332, magnet(s), a voice coil, a chassis, a yoke, cone, former, dust cap, and the like, as would be understood by one of ordinary skill in the art. Passive radiator 320 may include surround 422 and diaphragm 424. Active drivers and passive radiators can be formed of any suitable size, shape, or performance rating. For example, mobile audio device 300 may have a 70 mm diameter and 180 mm tall, with two 45 mm active drivers and two 45 mm×76 mm passive radiators. In some larger implementations, mobile audio device 300 may have a 84 mm diameter and 226 mm height, with two 50 mm drivers and two 50 mm×100 mm passive radiators. Any suitable size, dimension, or components can be used and any specific values included herein are merely provided as an example and are not intended to be interpreted as a limitation of any kind. Passive radiator 320 and/or housing 310 can further include dampeners (e.g., padding), seals, etc., for better air sealing, improved water resistance and a better acoustic efficiency (e.g., less acoustic leakage).

Speaker fastener 340 can be used to couple an active driver or passive radiator to the housing. Speakers fasteners can include mechanical couplers (e.g., screws, bolts, pins, etc.), adhesive (e.g., glue, tape), other fastening means (e.g., PHL), as would be understood by one of ordinary skill in the art. PHL-styled fasteners are further discussed in U.S. Pat. No. 9,462,361, which is hereby incorporated by reference in its entirety for all purposes.

Buttons/controls 360 can include any type of button or user interface on a mobile audio output device. For example, buttons/controls 360 can include volume buttons, media transport controls (e.g., play, pause, fast forward, rewind, record, etc.), wireless communication controls (e.g., a button to initiate a Bluetooth® pairing process), or the like.

Printed circuit board (PCB) 370 can be a single board or multiple boards that may include one or more processors, audio amplifiers, cross-overs, audio filters, wireless communications hardware (e.g., for Bluetooth®, IEEE 802.11, or other communication protocol), one or more energy storage devices (e.g., battery), power management circuitry, or other supporting circuitry, as would be understood by one of ordinary skill in the art.

Charging/data ports (not shown) can include any input or output interface for data transfer (e.g., audio data, digital data, etc.) to and from mobile audio output device 300. Energy storage device(s) (not shown) can include one or more rechargeable batteries including, but not limited to, nickel metal hydride (NiMH), nickel cadmium (NiCad), lithium ion, or the like. Mobile audio output device 300 is presented to provide a high level reference for components typically found in mobile speaker systems. One of ordinary skill in the art would understand the many variations, modifications, and alternative embodiments thereof.

Figure 4A:
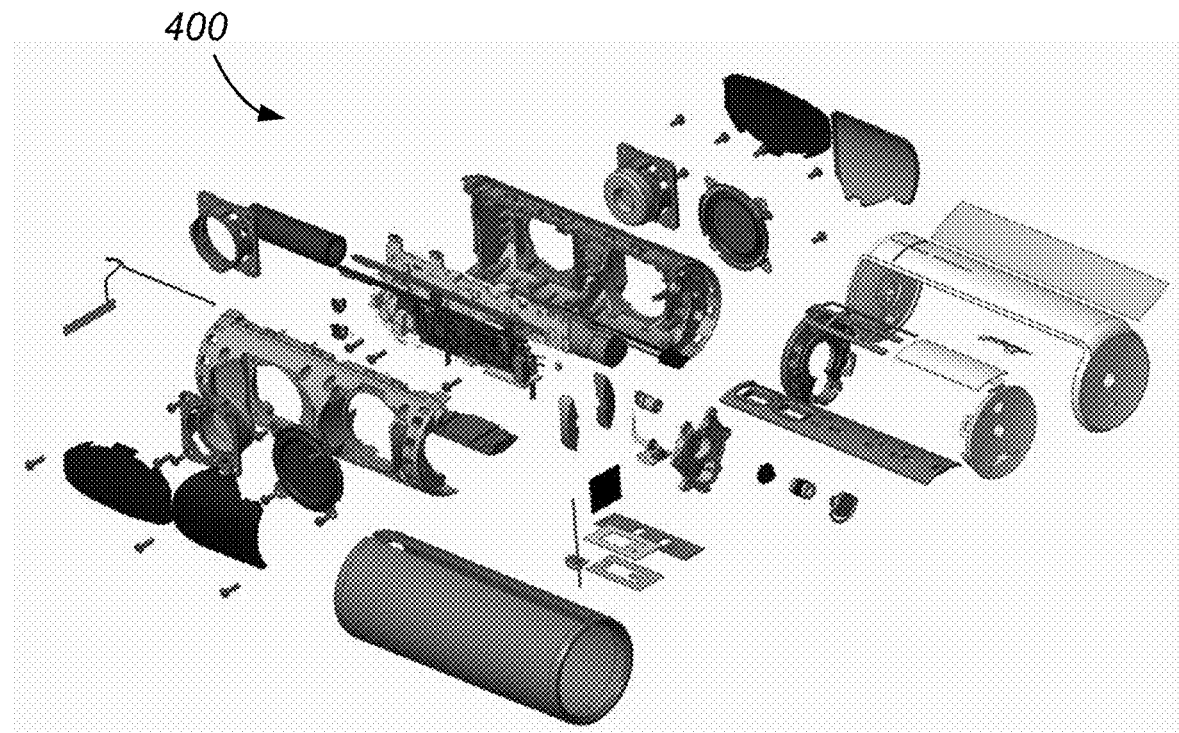
FIG. 4A shows an exploded view of a conventional mobile audio device.

FIG. 4A shows an exploded view of a conventional mobile audio device 400. Mobile audio device 400 can be comprised of many dozens of parts including not only the major components described above (e.g., housing, speakers, PCB, etc.), but many smaller components such as hardware, fasteners, gaskets, seals, tape, glue, etc. These types of components are typically installed by hand, which may not only be costly (e.g., due to both the increase in labor and by virtue of having to buy more parts), but may introduce human error in installation resulting in improperly seated gaskets, seals, or the like. Failure mechanisms associated with manufacturing errors can result in reduced acoustic efficiency (i.e., acoustic performance characteristics). Furthermore, certain fasteners require relatively large amounts of surface area to ensure a robust connection (e.g., a physically strong connection with proper air/water sealing), which can require the need of smaller acoustic drivers and a smaller available acoustic volume. More specifically, there can be a limited amount of room to get acoustic components inside of a speaker product (see, e.g., FIG. 3). If the fastening mechanism takes up more space, the acoustic elements (e.g., drivers) will be smaller, which can result in less surface area for the moving speaker elements, resulting in less displaced air and loss of acoustic performance and efficiency. To a lesser extent, acoustic performance and efficiency can be negatively affected by the resultant reduction in acoustic volume, as discussed above.

Figure 4B:
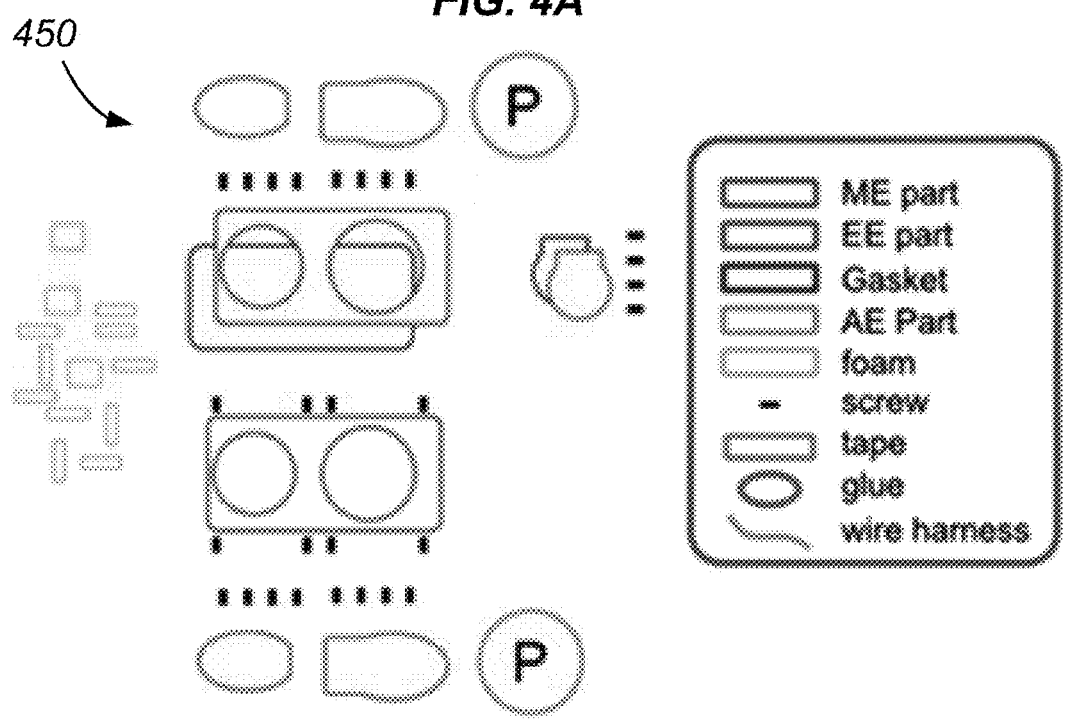
FIG. 4B shows an simplified exploded view of some of the various components specific to the housing for conventional mobile audio devices.

FIG. 4B shows an simplified exploded view of some of the various components specific to the housing for conventional mobile audio devices. These components may include a passive radiator ("passive"), a passive seal, a total acoustic enclosure, foam inserts for vibration damping, button membranes, driver and passive fasteners, seals around jacks, PCB seals (e.g., water seals and acoustic seals), PCB foam wrap, battery foam wrap, and the like. In some cases, there may be 50 or more individual elements, all of which typically require human installation and are subject to the inefficiencies and failure mechanisms discussed above.

Common Failure Mechanisms in Conventional Passive Radiator Coupling Methods

In conventional systems, passive radiators are typically coupled to a housing by fastening means (e.g., screws, pins, bolts, etc.), adhesives (e.g., glue, tape), or other mechanical means (e.g., piano hinge lock). There can be numerous problems with each conventional coupling methods as further discussed below with respect to FIGS. 5-6B.

Figure 5:
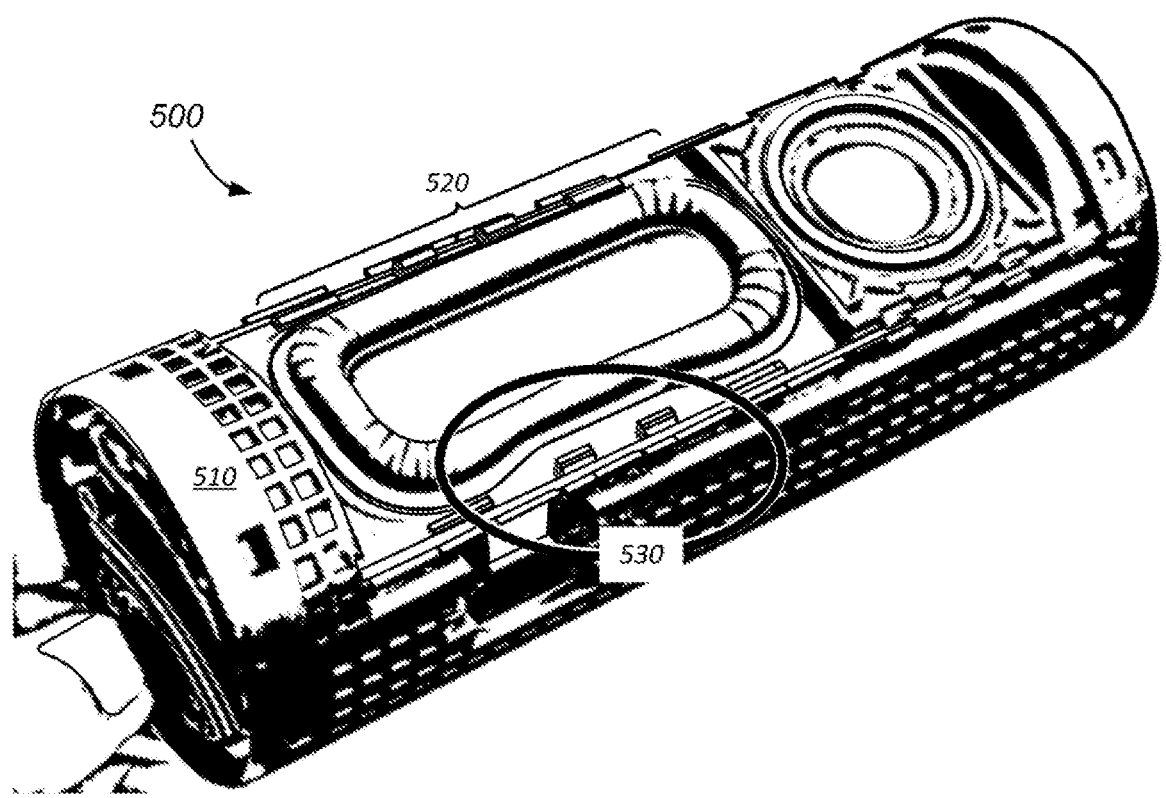
FIG. 5 shows a typical failure mechanism in adhesive-bonded speaker passive radiators.

FIG. 5 shows a typical failure mechanism in adhesive-bonded speaker passive radiators, according to certain embodiments. Mobile audio output device 500 includes passive radiator 520 coupled to housing 510 via an adhesive (e.g., glue). Adhesives can be heavily dependent on and subject to process controls. For example, adhesives may be applied in a non-uniform manner. One laborer may apply adhesive differently than another. Even the same laborer may inadvertently change the amount of adhesive applied each workday. Other manufacturing variables may include the adhesive application location, adhesive performance tolerances, time of the year (e.g., which can affect the ambient temperature and humidity), time of the day (e.g., which can affect the temperature), and other parameters subject to variation, which may be a significant problem for glue processes. Furthermore, adhesive failures may be hard to detect and can result in poor control of passive acoustic specifications (e.g., fundamental frequency (tuning frequency) can vary significantly if the shape of the surround is distorted because of mislocation during gluing), outgassing, and the like. Referring to FIG. 5, passive 520 is shown to be decoupling from housing 510 at location 530 due to manufacturing defects, as discussed above. More specifically, passive 520 is shown to be decoupling due to both failure of the glue (e.g., specification) and environmental effects (e.g., glue failed in high temperature use and passive 520 slid off the frame on housing 510). Adhesive may take up less space than hardware (e.g., screws), but typically suffer from high reliability risks and costs.

Figure 6A:
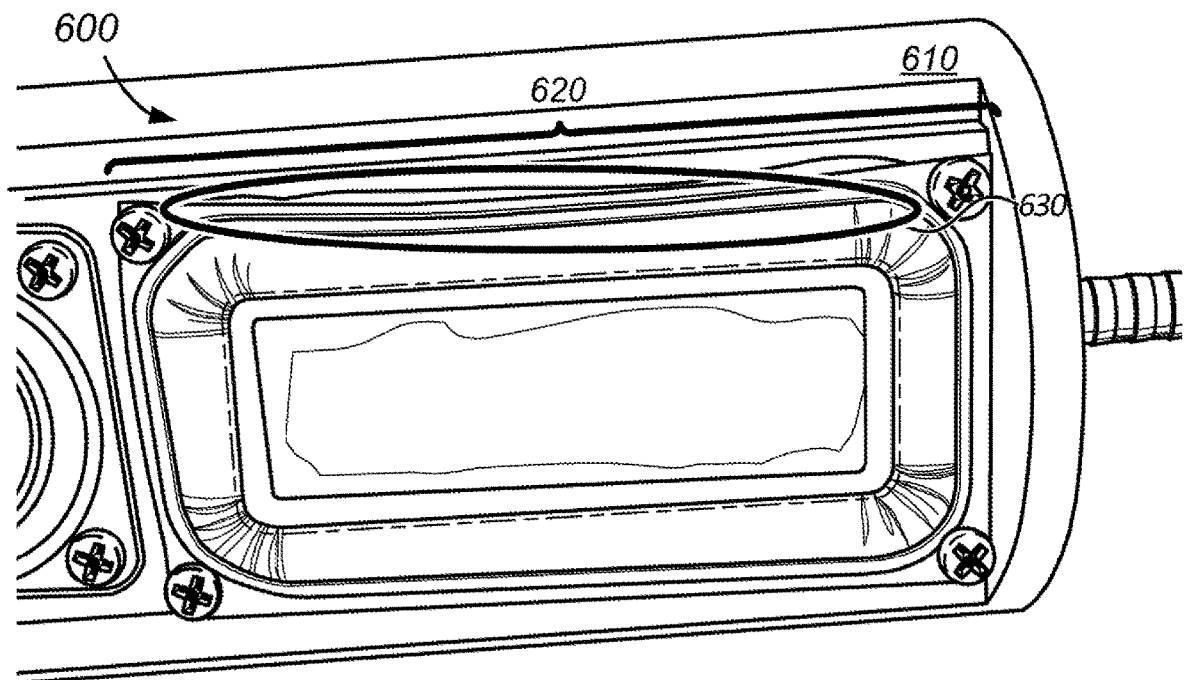
FIG. 6A shows a typical failure mechanism in hardware-bonded speaker passive radiators.
Figure 6B:
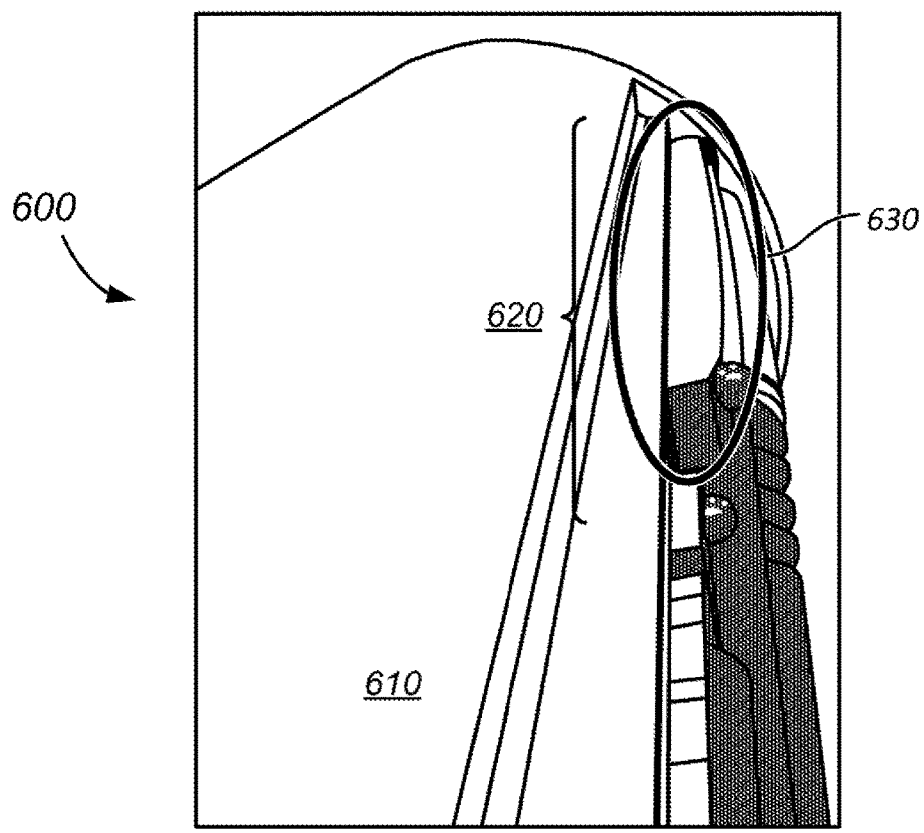
FIG. 6B shows a typical failure mechanism in hardware-based speaker passive radiators.

FIGS. 6A and 6B show a typical failure mechanism in hardware-based speaker passives. Mobile audio output device 600 includes passive radiator 620 coupled to housing 610 using screws. Mechanical hardware such as screws, tabs, pins, and the like, can be subject to many manufacturing problems including a lack of proper sealing, problems with thermal resistance, and increased labor costs. Increasing the number of screws can improve sealing conditions, but can also reduce the maximum size of the corresponding passive radiator, thereby sacrificing audio performance characteristics. Maintaining a proper seal is important for acoustic integrity (e.g., air leaking) and preventing outgassing. Glues can present problems for regulatory compliance and shipping due to outgassing. Glues can also cause cosmetic problems via chemical attack or transfer due to outgassing. Furthermore, thermal resistance can be a problem as exposure to high heat or large fluctuations in temperature can cause thermal expansion and contraction, which may warp the passive radiator and break the seal. Thermal creep can present significant challenges as well. For instance, most plastic injection molded materials deflect under very light loads (e.g., less than 1 MPa stress), which can cause the plastic to move away from the seals until the sealing pressure becomes very light (relative to the initial sealing conditions). This effect can be progressively worse as spans are longer, as depicted in FIGS. 6A-6B. Screws, and hardware in general, typically incur even greater reliability issues with passive radiators having large spans. Referring to FIGS. 6A and 6B, passive radiator 620 is shown having a warped passive/housing interface at least at location 630 resulting in a broken seal due to the poor thermal resistance characteristics of typical hardware coupling schemes.

Referring back to FIG. 3, mobile audio device 300 shows passive radiator 320 coupled to housing 310 using a piano hinge lock ("PHL") mechanism. Compared to mechanical hardware (e.g., screws) and adhesive, PHL can be more a more efficient with respect to space usage and labor costs. PHL typically requires less space than mechanical hardware, thereby allowing the use of larger passive radiators in a particular housing. Furthermore, PHL can be installed more quickly and can include fewer parts than hardware installations requiring a plurality of individual screws. However, PHL can have structural characteristics that constrain mold geometries and design possibilities, PHL tolerances require precise tuning, and they are frequently subject to drop-test failures (e.g., notch-sensitivities), as would be understood by one of ordinary skill in the art. Thus, despite the advantages presented by PHL over the mechanical and adhesive-based counterparts, problems still remain.

Integrating a Speaker Housing and Passive Radiator into a Continuous, Unitized Body The implementation of a unit body construction (e.g., with an integrated passive) affords many advantages over conventional designs. By forming the housing, speaker surround, and passive radiator ("passive" or diaphragm), among other features (e.g., seals, dampers, etc.), into a singular unitary body, many performance improvements are introduced, and many conventional manufacturing problems may be eliminated. As mentioned above, some of the performance improvements with unit body constructions with integrated passives can include fewer failure points, more compact designs possible, more acoustic volume available, more robust (e.g., against drop, shock, thermal conditions, etc.), and the like. Conventional systems (e.g., using adhesive, hardware, etc., as discussed above) cannot overcome many of these problems regardless of the amount of expenditures applied (e.g., top quality components, conventional fasteners, etc.). Furthermore, conventional systems usually include more parts (e.g., screws, glue, seals, dampers, individual passives, etc.), which can typically result in more potential failure points, more failures in the field, higher costs, and lower manufacturing yields. Labor, scrap and sensitivity to workmanship (e.g., deviations in manufacturing consistency) are negative side effects of current architectures and technologies for, e.g., adding passive radiators to products, as discussed above. Transportation costs, packaging, and inter-supplier relations (e.g., passives and housings manufactured by different entities) can further create logistical and cost-related challenges with conventional designs as well. These problems can be amplified with waterproof (e.g., IPx7 compliance) and life-proof designs (e.g., highly ruggedized designs), which can present even greater tradeoffs with cost, performance, and reliability, for the reasons discussed above.

In some embodiments, a continuous unitized body has fewer places to seal, and can be very robust compared to even the highest quality gaskets, which are subject to part tolerances (e.g., differences from part-to-part), assembly tolerances, assembly workmanship, and even damage during transport and handling (e.g., it can be common for seals to be defeated by dust, hair, or other particles introduced during manufacturing). A housing having a continuous unitized body can have greatly reduced (or eliminated) acoustic and water leakage, an improved drop-test performance (e.g., no individual parts moving relative to each other at impact), and a higher temperature resistance (e.g., no joints or seals highly susceptible to temperature induced expansion and contraction). Further advantages include a minimized stress at assembly interface, fewer buzzing failure points (e.g., sound vibrations causing adjacent parts to make an audible buzzing sound—typically mitigated by manually installing foam inserts), less sensitivity to process variation, tighter distribution (e.g., unit to unit) of fundamental frequency of the passive), and an overall better design for manufacturing (e.g., assembly is less dependent on worker skill, assembly yield is higher, and less labor is required).

Figure 7:
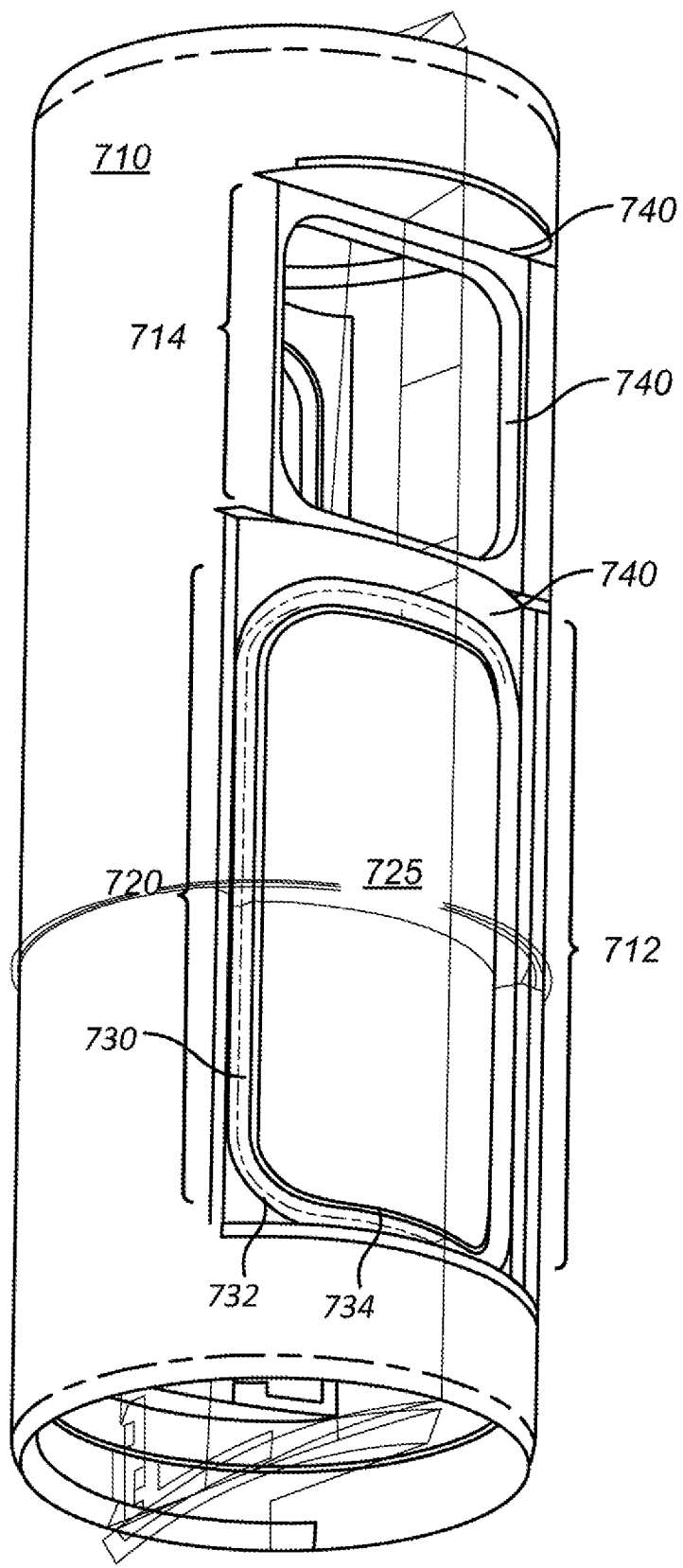
FIG. 7 shows a simplified drawing of a speaker housing having a continuous unitary body construction including a molded-in passive, according to certain embodiments.

FIG. 7 shows a simplified drawing of a speaker housing 710 having a continuous unitary body construction with an integrated passive, according to certain embodiments. Speaker housing 710 includes openings 712 (obstructed from view) and 715, passive radiator 720 including diaphragm 725 and inverted surround 730, and seals/vibration dampers 740. Passive radiator 720 can be disposed in opening 712. An active driver (not shown) may be disposed in opening 714. Housing 710 can be a continuous unitary body such that there are no seams, no multiple pieces (e.g., two halves coupled together), or other features indicative of a non-continuous unitary construction. In some cases, the continuous unitary body (and integrated passive) may have no seams, but still can include flashing, witness lines, etc., as would be understood by one of ordinary skill in the art. Housing 710, passive radiator (diaphragm) 725, speaker surround 730, and seals 740 all form a single, continuous unitary body that can be formed using an injection molding process, as further discussed below with respect to FIGS. 12-23. In some implementations, housing 710 can be 3D printed.

Diaphragm 725 can be coupled to housing 710 via a molded-in surround 730 to form passive radiator 720, according to certain embodiments. Passive radiator 720 can be comprised of liquid silicone rubber (LSR), thermoplastic polyurethane (TPU), or other suitable elastomer. Passive radiator 720 may be a high-specific gravity polymer, can be installed via a robotic-loaded insert, or may be formed with a 2 or 3-shot injection molding process, as further discussed below.

Speaker surround 730 can be an inverted surround, which can help for clearance purposes during manufacturing, as further discussed below. In some embodiments, molded-in surround 730 can be comprised of LSR or other suitable elastomer (e.g., butyl rubber). Housing 710 can further include molded-in seals and vibration dampers 740, according to certain embodiments. In some embodiments, one or more holes can be formed in housing 710 for any suitable purpose. For instance, some holes may be formed near a battery disposed inside housing 710 to allow for improved heat dissipation. Alternatively or additionally, holes can be used to form a waterproof membrane for a physical user interface with tactile switches and electronics housed inside a waterproof compartment. Housing 710 can be molded with any suitable features, protrusions, holes, etc., to accommodate any purpose (e.g., a docking region to receive and secure a printed circuit board, backside speaker components (e.g., magnet, voice coil, etc.), wire harnesses, etc.). One of ordinary skill in the art would understand the many variations, modifications, and alternative embodiments thereof.

Thus, certain embodiments of the invention include an injection-molded portable speaker apparatus including a portable speaker housing (710) with an opening (712) formed on the surface, a flexible inverted speaker surround (730), and a diaphragm (725) coupled to the flexible inverted speaker surround and suspended in the opening of the housing, where the speaker housing, inverted speaker surround, and diaphragm form a continuous, unitized body, as described below with respect to FIGS. 7-8. In some cases, the flexible inverted speaker surround includes an inner circumference (734) and an outer circumference (732), where the outer circumference can be coupled to an outer edge of the opening of the housing, and the diaphragm can be coupled to the inner circumference of the flexible surround such that the diaphragm is suspended within the opening of the housing. The flexible surround and diaphragm can form a speaker passive 720. It should be noted that the various speaker designs shown and described with respect to FIGS. 1-2 can include the novel continuous, unitary body construction as described with respect to FIGS. 7-11 as their internal design, or the conventional internal construction described above with respect to FIG. 3-6B. Furthermore, those of ordinary skill in the art with the benefit of this disclosure would understand how a continuous, unitary body construction can be applied to applications other than passive radiator integration. For instance, recessed buttons (e.g., using the same manufacturing processes described herein to make inverted surrounds) can be formed using similar principles (e.g., 2-shot injection mold process with first shot defining the housing and the second shot defining a seal and/or rubber button body), as further discussed below.

Housing 710 provides significant improvements over the conventional designs discussed above with respect to FIGS. 3-6B. For example, a unitary body design does not require additional space to install hardware (e.g., screws) or flanges for PHL or adhesive, which leaves more room for acoustic volume and better acoustic efficiency. Furthermore, less materials are required to manufacture the housing, surround, passive radiator, seals, vibration dampers, and the like (e.g., no hardware required, no gaskets, etc.), which can reduce the overall weight of the mobile audio device.

Housing 710 can have greater thermal resilience than conventional designs. For example, a unitary body design, as described, is not prone to glue failure due to melting, which is a common failure of glued-on passive radiator surrounds (see, e.g., FIG. 5). Furthermore, there are no gasket forces or unsupported spans (e.g., typically associated with hardware-based passive radiator installations), which may open or lift to form a gap due to thermal creep (see, e.g., FIGS. 6A-6B). This can be a significant failure mode in contemporary products, which typically address the issue by utilizing more and more internal product space to make the spans stiffer and more robust and sacrificing acoustic volume in the process. The unitary body design of housing 710, and the integrated passives particularly, are not subject to out-gassing from adhesives, as there is no sealing risk, no manual assembly (which can introduce human error in manufacturing), and no leak points between parts. Thus, the passive radiator 720 frame material can be merged with housing 710 to make a lighter, stiffer, and stronger construction that are formed into a single piece and are permanently bonded (e.g., no risk of separation).

As discussed above, diaphragm 725, surround 730, and/or seals and dampeners 740 can be formed of a liquid silicone rubber. LSR materials can have good water resistance and chemical resistance properties. To illustrate, IPX-7 is a waterproofing standard that measures reliability and performance under water immersion (e.g., at a depth of 1 meter), which can be approximately 5 kg of static force for 30 minutes. LSR has much better creep resistance than other conventional materials and can undergo much deeper water submersion without failure. LSR-based passive radiators can tolerate much greater depth for the same allowable creep. Better still, molded-in LSR passives (e.g., passive radiator 720) have the advantage of material continuity around the perimeter, as opposed to separately manufactured units. Being a continuous unitary body design, the passive radiator frame will not bow or bend between attachment points when exposed to high forces (e.g., deep-water immersion), as would likely happen with screws or PHL-type connections.

Continuous unitary body designs also eliminate or considerably reduce the need for human handling, presenting fewer opportunities for oils and contaminants to get into bonding and sealing joints. For instance, manufacturing operators (workers) sometimes contaminate glue surfaces (e.g., in the case of a conventional passive surround glued to a housing), which can cause them to fail over time. Also, workers can leave debris such as hair (a known occurrence with current manual assembly processes), which can contribute to faulty seals. These failure modes do not occur with molded in passive radiators, seals, surrounds, vibration dampeners, and the like, as these unwanted particulates cannot get into a joint if the joint is a single molded piece (i.e., continuous unitary body). Conventional designs typically cannot employ overlapping elements, which can provide certain advantages and may be implemented in continuous unitary body designs. For example, a driver frame cannot overlap a passive radiator frame in conventional designs, which can sacrifice critical millimeters in length that could otherwise be available for passive radiator surface area. In contrast, unitary body designs can allow space for a driver to at least partially overlap the passive frame, thus allowing the passive to be longer and have a larger effective area. Thus, embodiments of the invention using a continuous unitary body design with molded in passive radiators can have as much as a 15% acoustic performance boost or more (based on product size) due to the increased available surface area that would not be available in conventional designs (e.g., no additional surface area needed to accommodate screws, PHL, or adhesives).

Acoustic tuning can be important for producing a mobile audio device with optimal audio performance characteristics. For instance, a housing, passive radiator, or other component, may have a particular resonant frequency. Typically, the closer that the resonant frequencies of different components are matched, the better that the overall audio quality of the mobile audio device (or any speaker system) will be. Acoustic tuning can pose significant challenges with conventional designs (e.g., see FIG. 3). There are typically manufacturing tolerances with separately manufactured passive radiators, housings, etc., that can affect the acoustic tuning of the corresponding mobile audio device. For instance, separately manufactured passive radiators and housings may have mismatched resonant frequencies (e.g., resonant frequencies that differ beyond an acceptable threshold value). A typical range on some portable consumer audio products may have a resonant frequency range of 40-100 Hz. For instance, some embodiments can have 55 Hz+/−10 Hz. Conventional solutions to these problems can include pairing passive radiators and housings based on their resulting resonant frequencies, or fine tuning equalizers and compressors (e.g., firmware and electrical parts), however tuning can be limited and may not overcome some large variances (e.g., 15 Hz in some cases). Typically, software or equalizer (EA) tuning is not usually be applied to each individual speaker. If the passive radiator has a tighter tolerance on the fundamental frequency, then the equalizer or software tuning can be more effective. However, resonant frequencies can also shift during assembly (e.g., non-uniform amounts of adhesive, non-uniform application of adhesive over an area, etc.), which can further detrimentally affect the acoustic tuning of the corresponding mobile audio device even after pairing components.

In certain embodiments, acoustic tuning between components for a continuous unitary body design can be superior to conventional designs as the housing, diaphragm, passive radiator, and seals/dampeners are manufactured at the substantially the same time (e.g., two or more shots in an injection molding process) and assembly variances are effectively non-existent as no manual assembly is required. In some cases, acoustic tuning can be performed by making changes to the materials used, which can affect material hardness, elasticity, or other material properties. Furthermore, acoustic tuning can be manipulated by mold process controls (e.g., packing pressure, injection speed, temperature, mold temperature, etc.), which can both improve the overall acoustic performance (e.g., better standard deviation on resonant frequency and stiffness measurements) and present faster product-to-market conditions (e.g., no manual assembly required). It should be noted that injection molding process parameters are far more stable and easier to measure than workmanship and glue dispensing.

In some embodiments, continuous unitary body designs (e.g., housing 710) can be highly resistant to extreme forces (e.g., impacts) and may maintain acoustic integrity (e.g., no seal breaks) in conditions that would ordinarily warp, damage, or otherwise compromise conventional designs (e.g., see FIG. 3). For example, during drop tests (e.g., a standard quality assurance qualification manufacturing procedure) the impact forces often cause the passive radiator frame (e.g., the portion that couples the passive radiator to the housing) to move away from the housing to a degree that causes the corresponding gasket (e.g., seal) to twist or move. When the frame is reseated (e.g., when deceleration ceases after impact), the gasket could remain in a pinched position, thereby defeating the seal. Manufacturers can have a very difficult time designing around this issue, and even harder to detect a failure rate for the customer since the failure mechanism is highly dependent on the exact drop conditions (e.g., height, angle, etc.), which may or may not be uncovered during typical qualification procedures. Furthermore, drop test simulations can be very expensive, time consuming, and cannot be guaranteed to be accurate, regardless of the quality of the simulation model. In contrast, a continuous unitary body (e.g., housing 710) including molded-in components (e.g., passive radiator 720 and seals/dampeners 740) does not require simulations, drop tests, or special design changes (typically amounting to design trade-offs) since pinching and reseating issues do not occur in a continuous, unitary construction.

In certain embodiments, continuous unitary body designs can be significantly cheaper to manufacture than conventional designs (e.g., FIG. 3) as there are may be no additional costs (e.g., markups) for multiple suppliers of individual parts that can be integrated into a unitary body design. For example, passive radiator seals, button membranes, driver or passive fasteners, seals around jacks or I/O interfaces, PCB seals (water and acoustic), PCB foam wraps, battery housings, battery foam wraps, and the like, can all be integrated in a unitary body design, according to certain embodiments. Additionally, there is no additional labor for passive radiator assembly, no transport or handling costs for integrated components (e.g., passive radiators), and generally a higher assembly yield since assembly variation is typically not a material factor, as discussed above. One of ordinary skill in the art would understand the many manufacturing, assembly, reliability, and performance advantages inherent in continuous unitary body designs.

Although the majority of the present disclosure discusses the integration of a passive radiator on a speaker housing to form a continuous, unitized body, it would be understood by one or ordinary skill in the art with the benefit of this disclosure that any number of passive radiators having any suitable dimensions are possible. Furthermore, other features can be formed and integrated as well, including damping features (e.g., grill dampers), seals, gaskets, buttons, etc. (e.g., typically during the same shot in the injection mold process—see, e.g., FIGS. 12-22).

Figure 8:
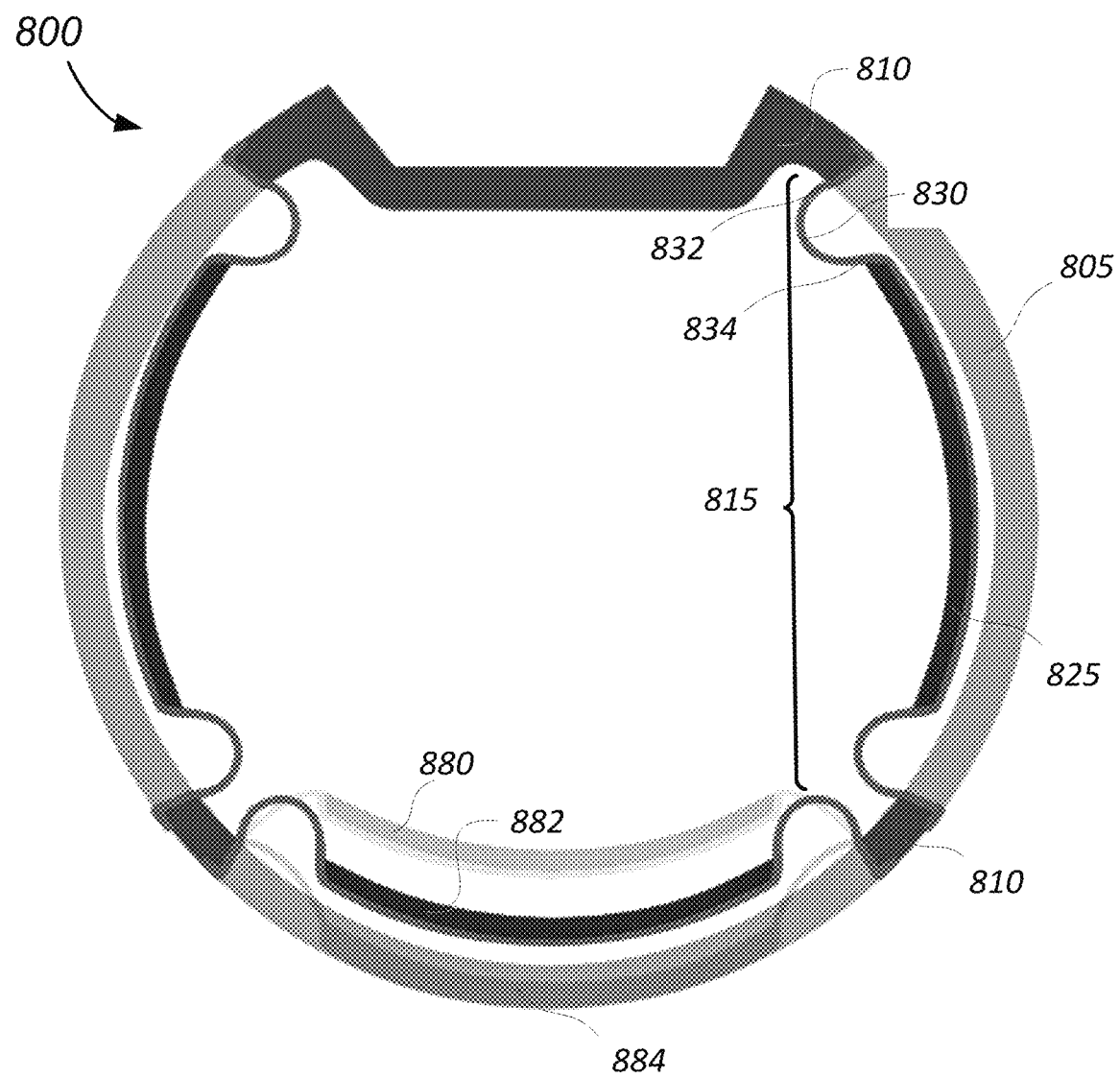
FIG. 8 shows a simplified drawing of a cross-section of mobile audio device having a housing with a continuous unitary body construction and integrated inverted surround, according to certain embodiments

FIG. 8 shows a simplified drawing of a cross-section of mobile audio device 800 having a housing with a continuous unitary body construction, according to certain embodiments. Mobile audio device 800 includes housing 810 having opening 815, inverted surround 830, diaphragm 825, and grill 805 (see FIG. 1 for reference). Diaphragm 825 is typically weighted steel, although other materials and compounds can be used (e.g., stamped aluminum, high specific gravity plastics (e.g., tungsten-filled Polyamide or polycarbonate)). In some embodiments, polycarbonate (PC) may be used when over-molding LSR as they can be very compatible for coupling. In some cases, surrounds can be comprised of LSR, many various grades of TPU, certain gas-assist or foamed materials, as would be understood by one of ordinary skill in the art with the benefit of this disclosure. Grill 805 can be constructed with perforated steel, molded plastic with a holed pattern, or other material with similar structural and acoustic properties. In some cases, no grill may be used. For instance, there can be an open span covered by fabric, or even an exposed driver or passive (visible externally). Inverted surround 830 includes inner circumference 834 (coupled to diaphragm 825) and outer circumference 832 (coupled to housing 810 at outer edge of opening 815). The particular embodiment shown in FIG. 9 includes 3 sets of passive radiators (i.e., combination of diaphragm and inverted surround), although any number of passive radiators may be implemented. Due to the flexibility of inverted surround 830, the passive radiators are afforded a considerable range of movement (e.g., position 880, 882, 884) that supports good air displacement during operation, and allows the passive radiator to extend at least beyond a bottom surface of housing 110 such that an injection molding core can be removed with no intervening undercuts, as further discussed below with respect to FIGS. 12-23.

In certain embodiments, multiple injection mold "shots" can be employed. For example, the first shot may be for forming the housing, a second shot may be for molding a diaphragm (e.g., if molded of plastic), a third shot may be for an LSR over-mold, and additional shots (e.g., $4^{th}$ shot) can be any additional functional part. For instance, for two hardnesses of LSR (e.g., shore 40 A passive surround and a softer shore 20 A driver seal).

Figure 9:
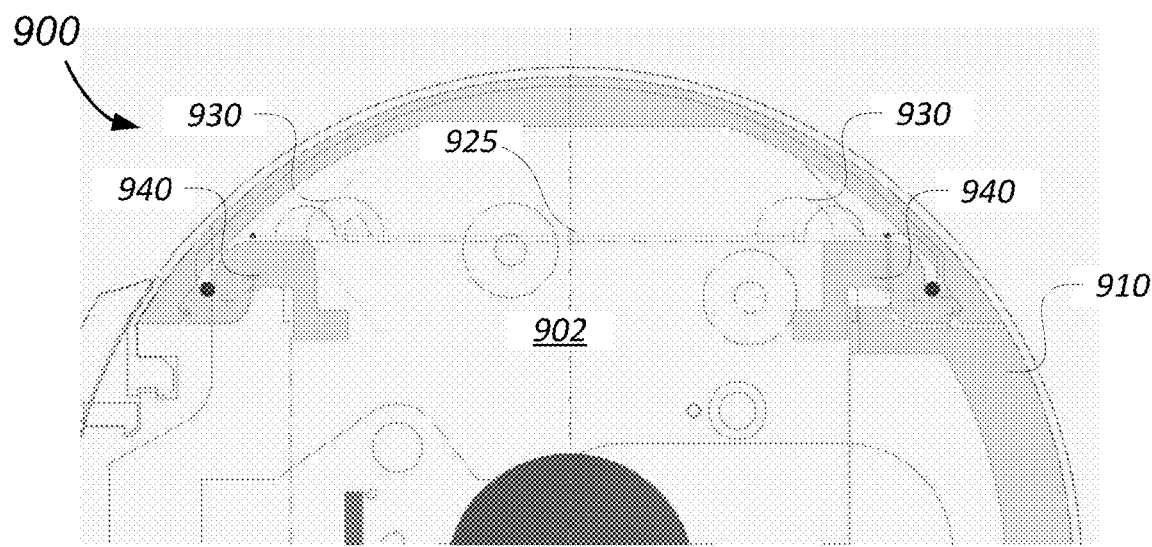
FIG. 9 shows a mobile audio device with a housing, diaphragm, speaker surround, and piano-hinge lock (PHL) hardware for fastening the passive radiator to the housing.
Figure 10:
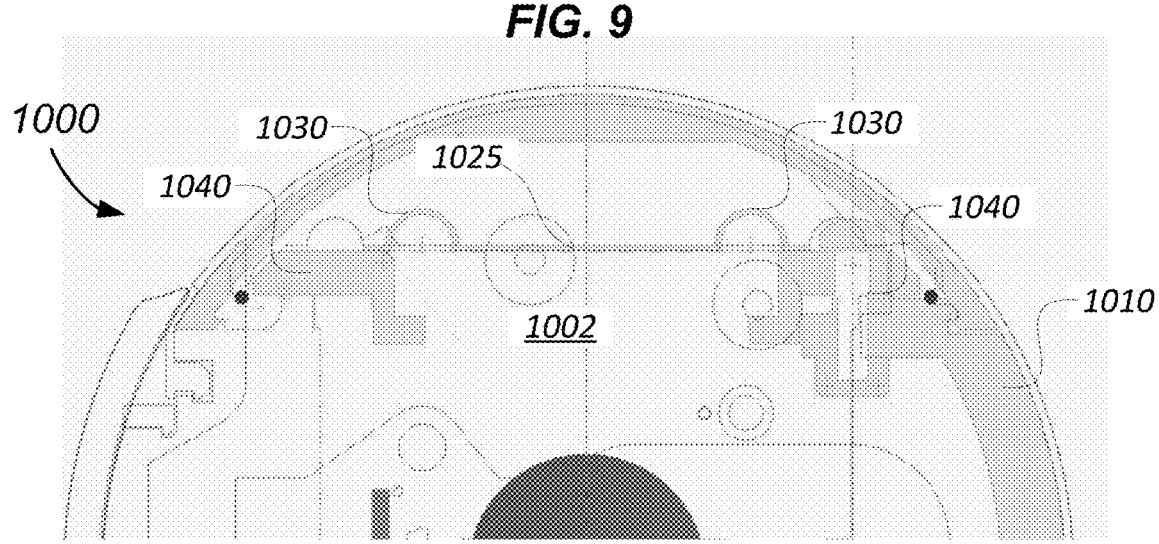
FIG. 10 shows a mobile audio device with a housing, diaphragm, speaker surround, and conventional hardware (e.g., screws) for fastening the passive radiator to the housing.
Figure 11:
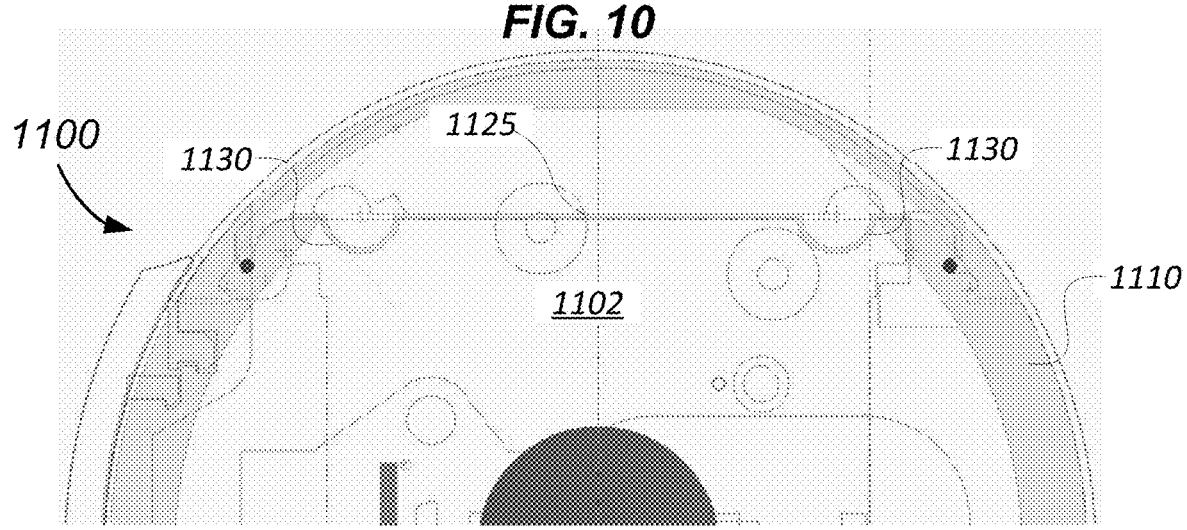
FIG. 11 shows a mobile audio device with housing, diaphragm, and inverted speaker surround integrated into a continuous, unit body construction, according to certain embodiments.

FIGS. 9-11 illustrate how an integrated passive radiator with a unit body construction allows a greater acoustic volume and larger active/passive components over conventional speaker fastening methods, according to certain embodiments. The acoustic volume corresponds to an amount of space (i.e., size of an acoustic cavity) within the mobile audio device. Generally, a greater acoustic volume typically corresponds to an improved power and efficiency (e.g., better frequency response—particularly at bass frequencies).

FIG. 9 shows a mobile audio device 900 with housing 910, diaphragm 925, speaker surround 930, and PHL hardware 940 for fastening the passive radiator (i.e., diaphragm 925 and surround 930) to housing 910. As indicated above, PHL can provide an advantage over conventional mechanical coupling methods (e.g., screws, pins, etc.) and requires less space for an improved acoustic volume 902. However, PHL hardware 940 still encroaches the available space that ultimately limits the potential size of the passives and/or active drivers, as well as the available acoustic volume 902, as shown.

FIG. 10 shows a mobile audio device 1000 with housing 1010, diaphragm 1025, speaker surround 1030, and conventional hardware 1040 (e.g., screws) for fastening the passive radiator (i.e., diaphragm 1025 and surround 1030) to housing 1010. Note that acoustic volume 1002 is much smaller than the acoustic volume of the PHL-based design of FIG. 9. Conventional mechanical hardware typically introduces considerable encroachment in the available acoustic volume because of the need for more space and surface area of housing 1010 for proper support and reinforcement. This usually results in a smaller passive radiator and significantly less acoustic volume 1002, as shown.

FIG. 11 shows a mobile audio device 1100 with housing 1110, diaphragm 1125, and inverted speaker surround 1130 integrated into a continuous, unit body construction, according to certain embodiments. The passive radiator (i.e., diaphragm 1125 and surround 1130) is directly coupled to housing 1110 with no intervening hardware or adhesive such that little to no extra underlying support is needed (i.e., no encroachment of acoustic volume 1102 due to speaker support structures). Thus, the passive radiator size and underlying acoustic volume can be maximized. Referring to FIG. 11, inverted surrounds 1130 are positioned all the way to housing 1110 (because no intervening passive coupling hardware is required), thereby allowing a significantly larger diaphragm 1125 and acoustic volume 1102 than the conventional designs of FIGS. 9-10.

Methods of Injection Molding a Speaker Housing with a Continuous, Unit Body Construction FIGS. 12-22 illustrate aspects of injection molding a speaker housing and passive radiator to create a continuous, unit body construction using a two-shot injection molding process, where the first shot forms the speaker housing, and the second shot forms the inverted flexible surround. The diaphragm may be over-molded during the second shot, such that the diaphragm is part of the continuous unit body. The implementation of an inverted flexible surround can be advantageous because it allows the speaker passive assembly (e.g., combination of the speaker surround and diaphragm) to be pulled away from the center tooling core such that the core is unobstructed (i.e., no undercuts) as it is removed from the speaker housing. The problem of undercuts has been a primary technical hurdle that has thwarted others from manufacturing a unitary body construction, as shown and described herein.

Figure 12:
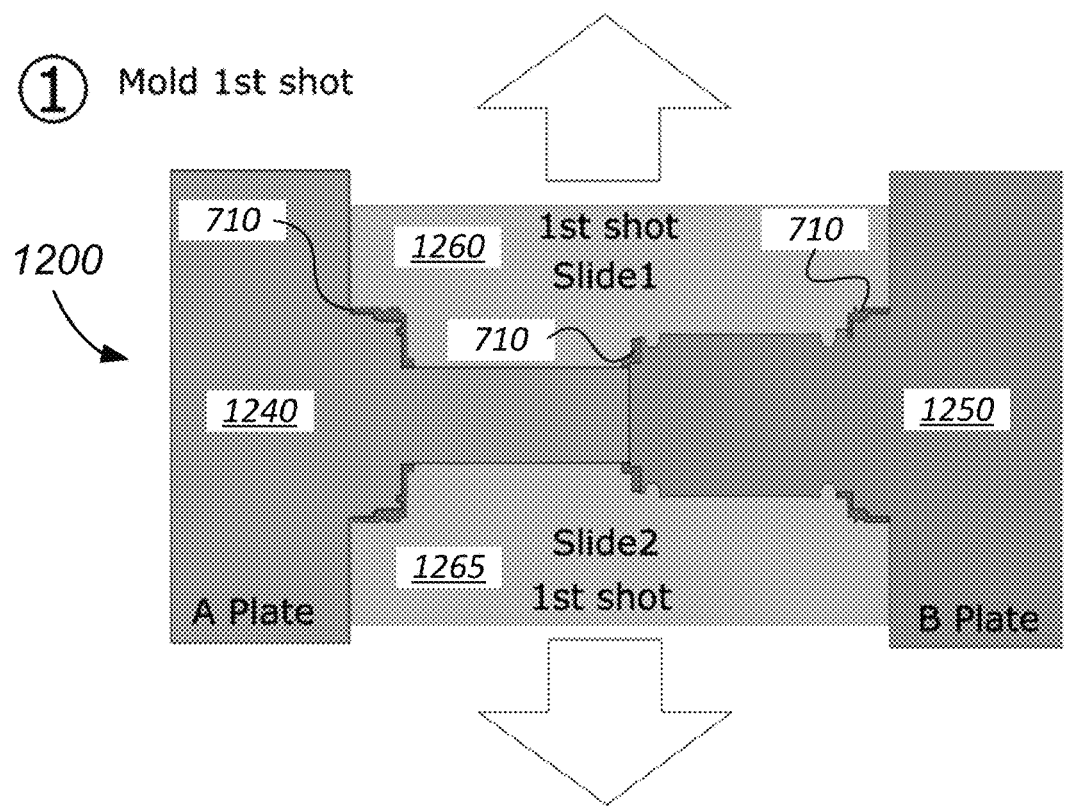
FIG. 12 shows a cross-sectional view of an injection molding process for manufacturing a speaker housing having a continuous, unit body construction, according to certain embodiments.

FIG. 12 shows a cross-sectional view of an injection molding process for manufacturing a speaker housing having a continuous, unit body construction, according to certain embodiments. A simplified representation of an injection molding machine 1200 is shown with a number of plates that define the shape of the continuous, unit body. Other injection molding machine components (e.g., platens, hopper, heater, reciprocating screw, barrel, nozzle, etc.) are not shown or described as their operation would be understood by one of ordinary skill in the art.

Plates 1240 ("A Plate") and 1250 ("B Plate") define the core of housing 710, according to certain embodiments. That is, plates 1240, 1250 define the various contours of the inside of housing 710, which will be a hollow cylinder, as shown in FIG. 7. Slide plates 1260 ("first shot slide 1"), 1265 ("first shot slide 2") define the outer surface of housing 710. That is, slides 1 and 2 define the thickness of housing 710 and any contours, protrusions, or openings (e.g., opening 712). Referring to FIG. 12, Plates A and B are abutted and slides 1 and 2 are placed in position. A "first shot" ensues and the cavities formed within plates A, B and slides 1, 2 are filled with a first material, which forms housing 710. It should be noted that certain embodiments may use more or fewer slides (e.g., four slides), as would be understood by one of ordinary skill in the art. In some cases, the first material can be a polycarbonate (PC), although any injection molded plastic can be used. In some exemplary embodiments, PC is used because of good bonding properties and reasonable processing and cost. Some other materials may include polyamide (PA), polybutylene terephthalate (PBT), and the like.

Figure 13:
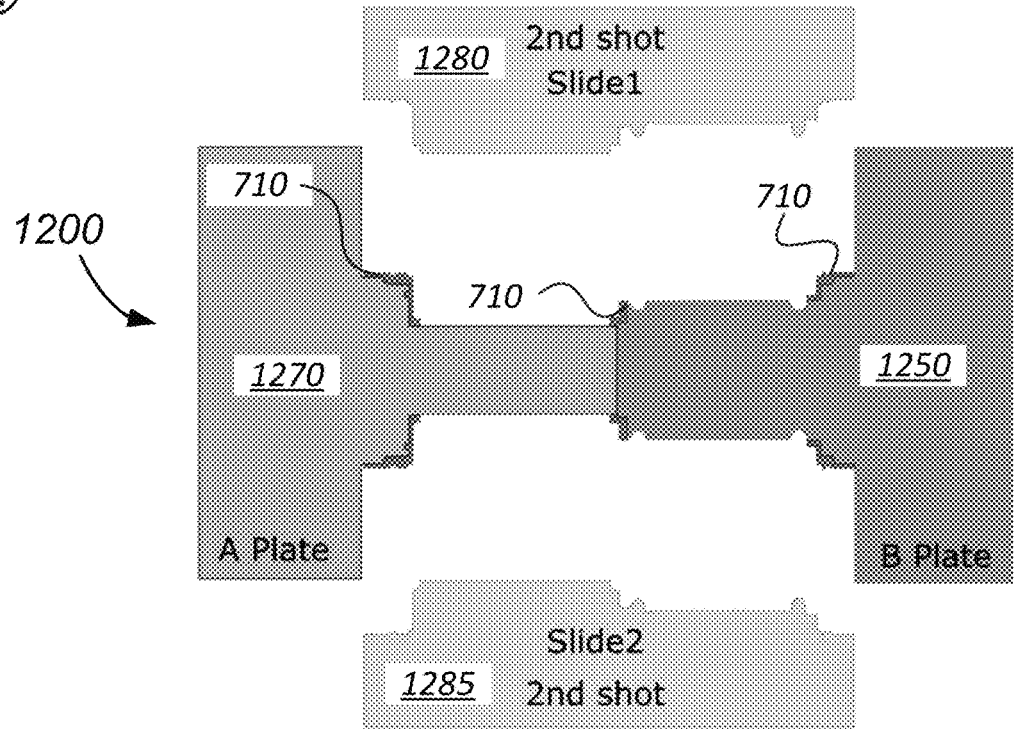
FIG. 13 shows a cross-sectional view of aspects of an injection molding process for manufacturing a speaker housing having a continuous, unit body construction, according to certain embodiments.
Figure 14:
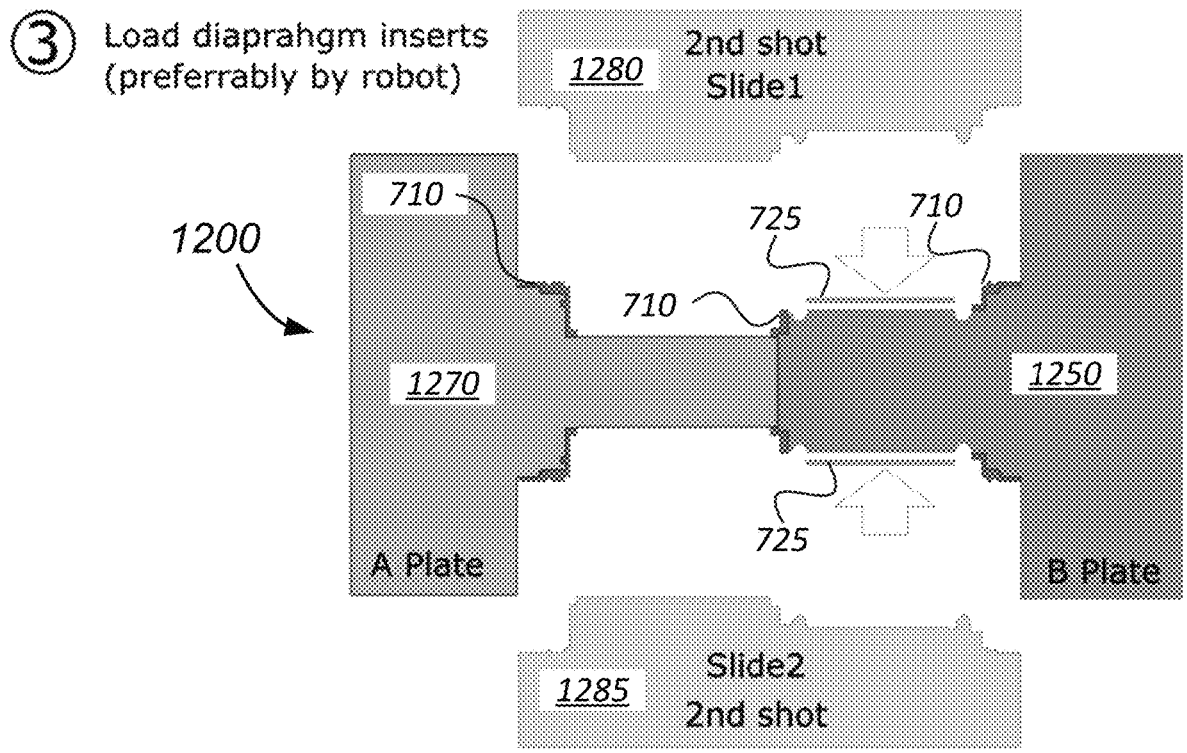
FIG. 14 shows a cross-sectional view of aspects of an injection molding process for manufacturing a speaker housing having a continuous, unit body construction, according to certain embodiments.
Figure 15:
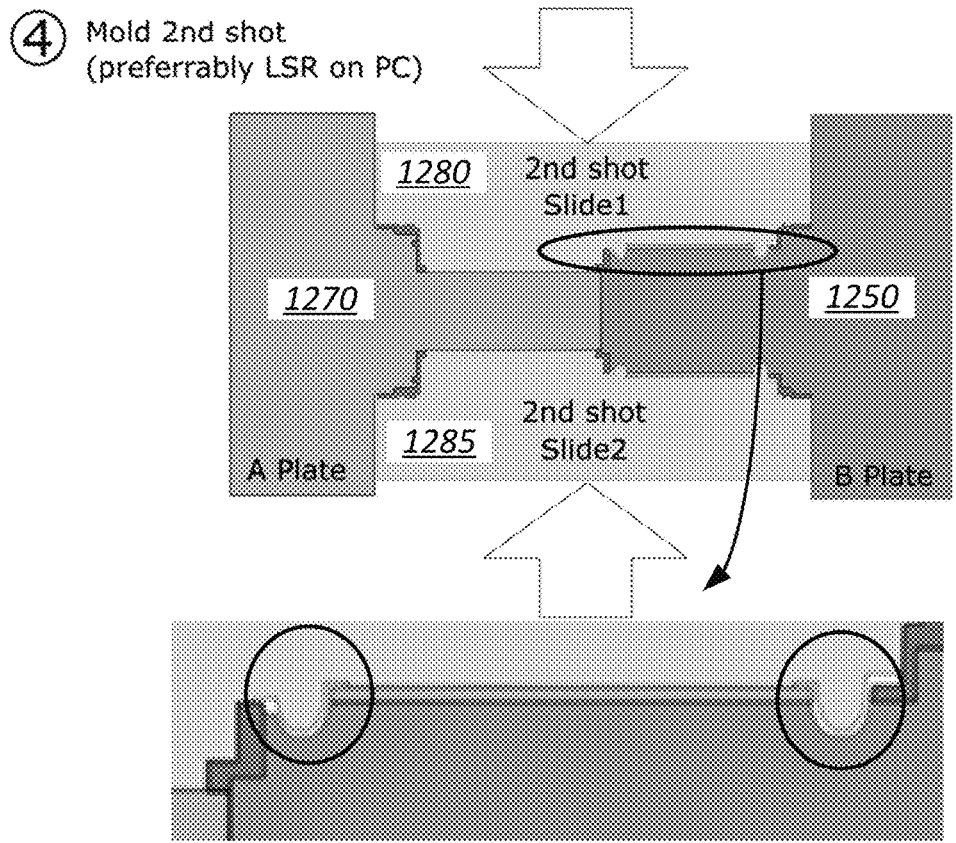
FIG. 15 shows a cross-sectional view of aspects of an injection molding process for manufacturing a speaker housing having a continuous, unit body construction, according to certain embodiments.
Figure 16:
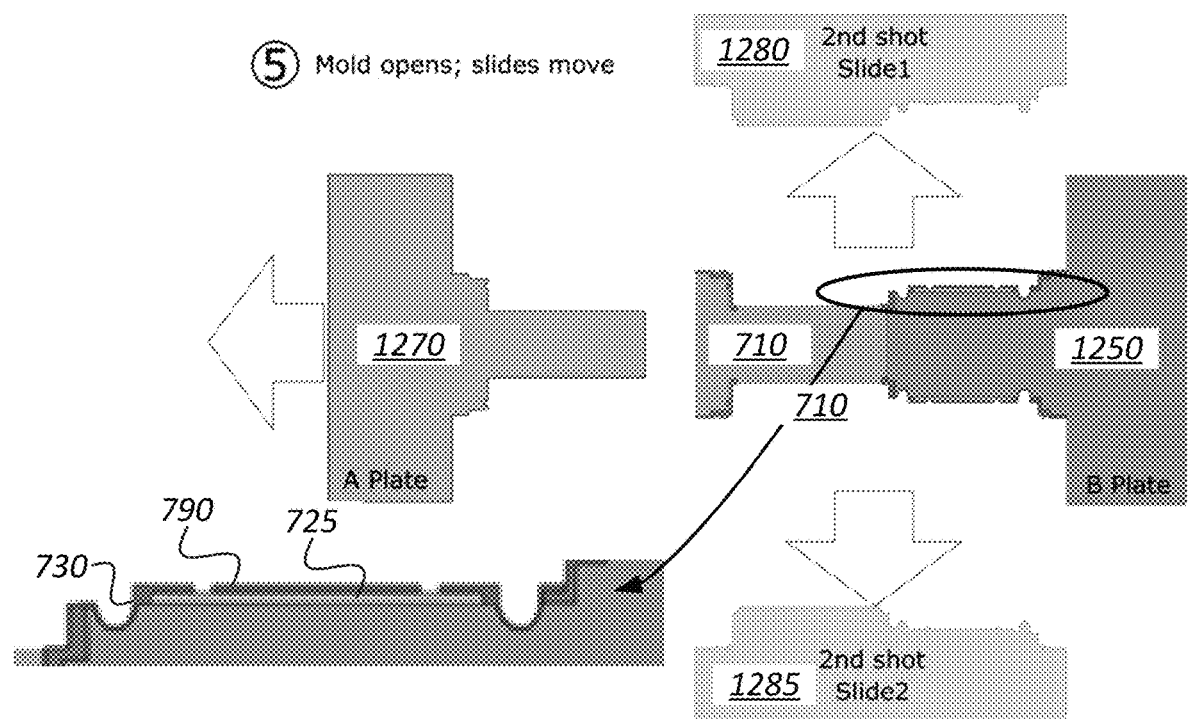
FIG. 16 shows a cross-sectional view of aspects of an injection molding process for manufacturing a speaker housing having a continuous, unit body construction, according to certain embodiments.

FIG. 13 shows a cross-sectional view of an injection molding process for manufacturing a speaker housing having a continuous, unit body construction, according to certain embodiments. In FIG. 13, newly formed housing 710 (e.g., the first shot) is indexed to a second station to undergo a second shot using a second material. Housing 710 is still attached to plate 1250, however a new abutting "A Plate" 1270 and second shot slide plates are introduced (second shot slide 1 (1280) and second shot slide 2 (1285)). In FIG. 14, diaphragms 725 are placed in opening 712. In some cases, diaphragms can be manually or automatically placed (e.g., by a robot). In FIG. 15, the second shot is performed. The new cavities formed by plates 1250, 1270 and slides 1280 and 1285 can define the dimensions of inverted surrounds 730. In some embodiments, the second shot can be used to define other features, including gaskets, seals, or other features, as would be understood by one of ordinary skill in the art with the benefit of this disclosure. In some exemplary embodiments, the second shot can be LSR or TPU over PC, although other combinations of materials are possible. In FIG. 16, the mold opens (i.e., plates 1250, 1270 and slides 1280 and 1285 are separated), and inverted surrounds 730 and the over-molding 790 over diaphragm 725 is formed, while the housing remains on the core plate 1250.

Technical Challenges of Removing a Core Plate with Undercuts

Figure 25:
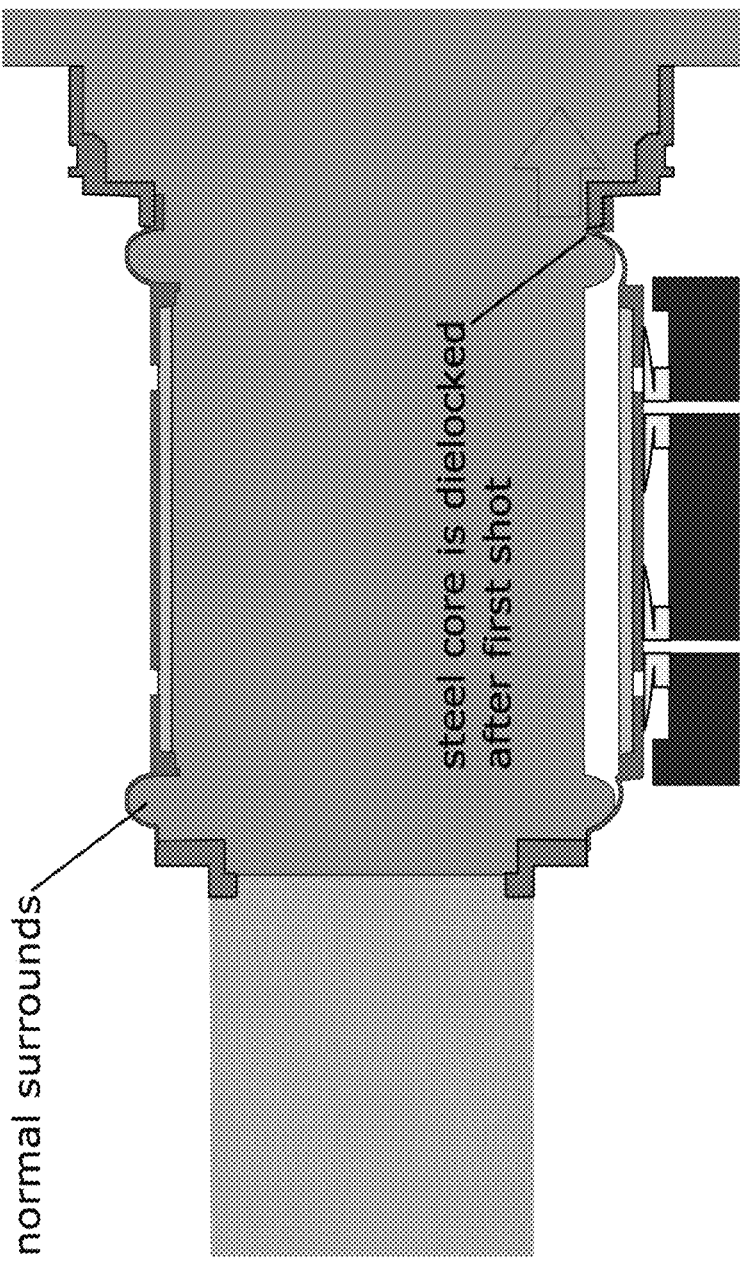
FIG. 25 shows a typical problem associated with manufacturing a unit-body housing with integrated conventional surrounds, according to certain embodiments.

One of the primary challenges with injection molding a continuous, unit body speaker housing is dealing with undercuts as the molding cores are removed. Speaker surrounds on unit body housings create significant challenges in this regard. Speaker surrounds can be defined by a core plate (e.g., defining a bottom surface of the surround) and slide plate (e.g., defining an upper surface (i.e., thickness) and dimensions of the surround). In embodiments having a normal (i.e., non-inverted) surround, the core (e.g., B Plate) protrudes up from the housing to define the contour of the surround. Therefore, any feature lower than the peak of the speaker surround (e.g., most of the housing, the passive surround, etc.) effectively becomes undercut, which prevents the core from sliding out once the molding process is complete, which is commonly referred to as being "die locked" (see, e.g., FIG. 25). The use of inverted surrounds can resolve this problem as the inverted surrounds themselves effectively become the undercut in this configuration, and by various techniques, the inverted surrounds can be lifted to clear the path for the core to be removed. Some of these techniques can include using a robot end effector to latch onto a passive radiator by grabbing onto a boss, hole, or other feature designed to make it possible for the robot to grab the passive and lift it out of the way of the core. In some embodiments, a robot end effector uses a vacuum to grab the passive radiator and pull it up to clear the path (see, e.g., FIG. 17). Alternatively, the passive radiator can be pushed away from the core by using gas ejection via a poppet valve embedded in the core (see, e.g., FIGS. 18-19). In some cases, a travelling core can be used to remove the housing from the core, as shown and described below with respect to FIGS. 20-22.

Figure 17:
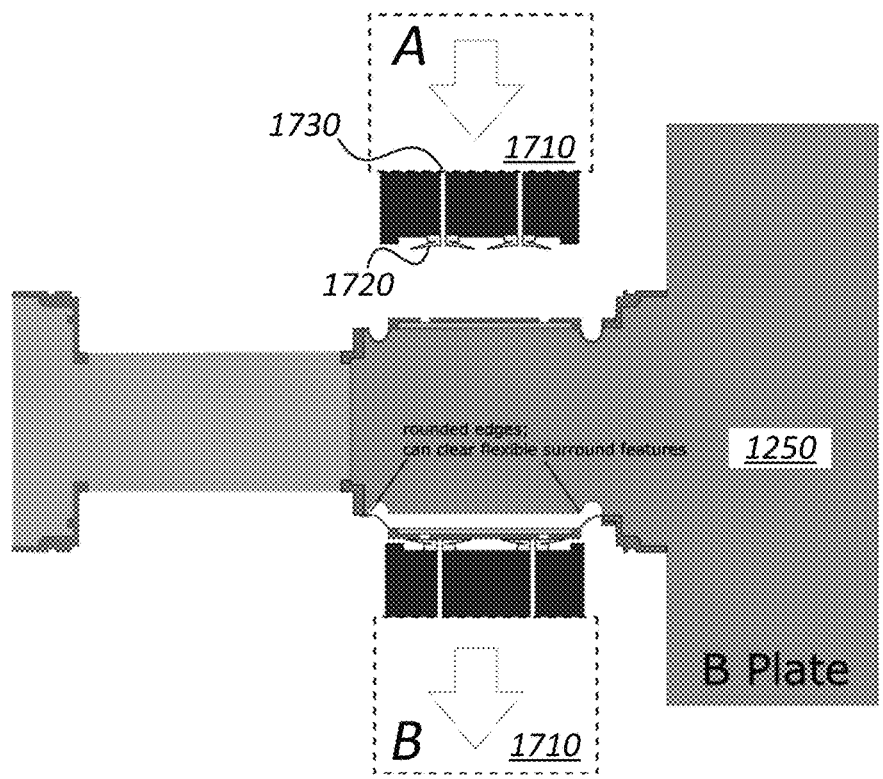
FIG. 17 shows aspects of removing an injection molding core from a speaker housing having a continuous unitized body construction using vacuum lifting, according to certain embodiments.

FIG. 17 shows aspects of removing an injection molding core from a speaker housing having a continuous unitized body construction using vacuum lifting, according to certain embodiments. The continuous unit body comprised of housing 710, inverted surround 730, and diaphragm 725 is still formed around plate 1250 with inverted surround 730 forming undercuts that prevent plate 1250 ("core") from being removed. In some implementations, a robotic device 1710 can be positioned to move from a disengaged position (e.g., shown in "A") to an engaged position (e.g., shown in "B") to cause grabber 1720 ("robot gripper/grabber, also referred to as "end effector") to contact the passive radiator (i.e., over-molding on diaphragm 725). A vacuum line 1730 can create a suction such that grabber 1720 latches on to the passive radiator and lifts, thereby creating a clearance 1750 (i.e., no undercuts) for core plate 1250 to be removed. Alternatively or additionally, certain features on the radiator (e.g., a protrusion, boss, hole, etc.) can be latched on to for a mechanical coupling.

Figure 18:
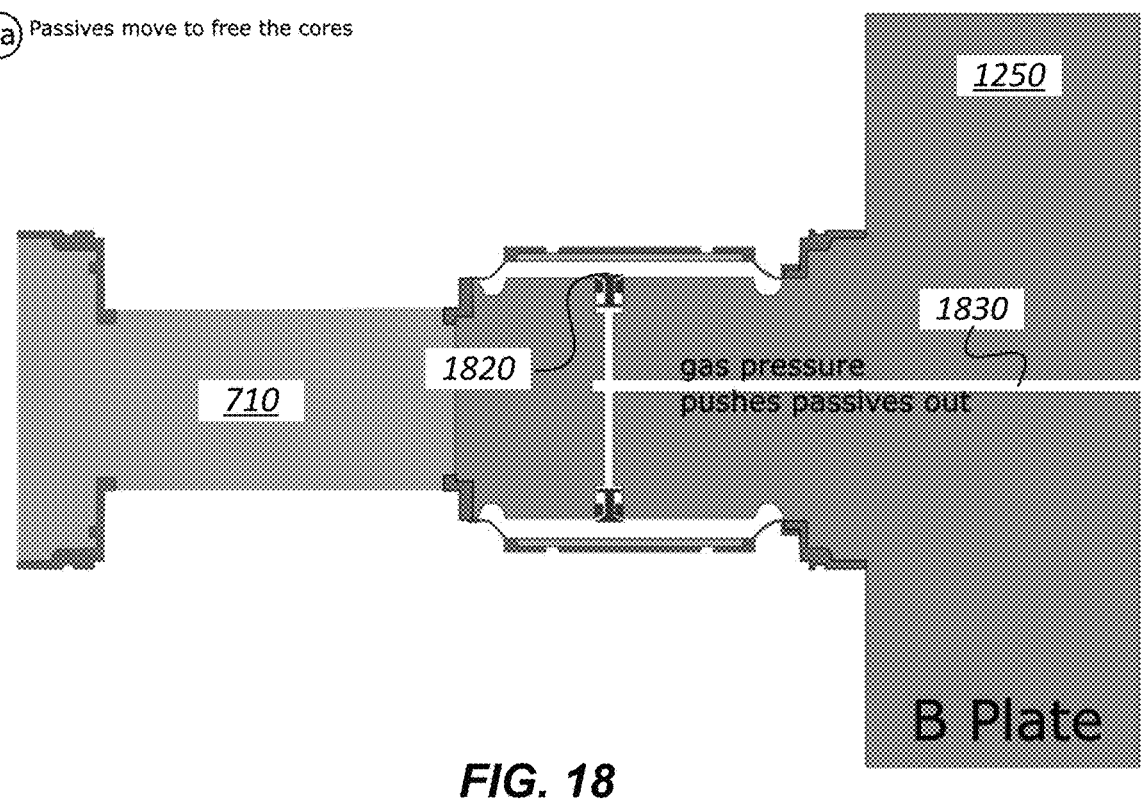
FIG. 18 shows aspects of removing a injection molding core for a speaker housing having a continuous unitized body construction using gas ejection, according to certain embodiments.
Figure 19:
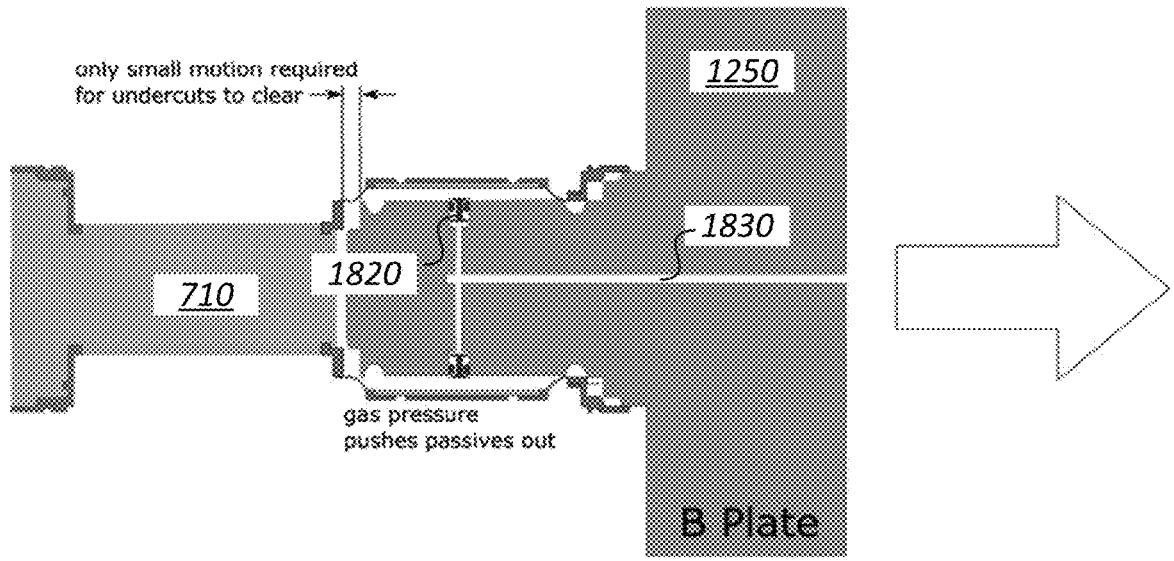
FIG. 19 shows aspects of removing a injection molding core for a speaker housing having a continuous unitized body construction using gas ejection, according to certain embodiments.

FIG. 18 shows aspects of removing a injection molding core for a speaker housing having a continuous unitized body construction using gas ejection, according to certain embodiments. In FIG. 18, the passive radiator can be pushed away from the core by using gas ejection via a poppet valve(s) 1820 and gas line(s) 1830 embedded in the core. In FIG. 19, a small amount of motion may be needed for the undercuts to clear, as shown. In some cases, no undercuts may exist when the speaker passive is pushed away from the core (e.g., inverted surround 730 may be completely moved from the path of plate (core) 1250.

Figure 20:
FIG. 20 shows aspects of removing a injection molding core for a speaker housing having a continuous unitized body construction using a travelling core, according to certain embodiments.
Figure 21:
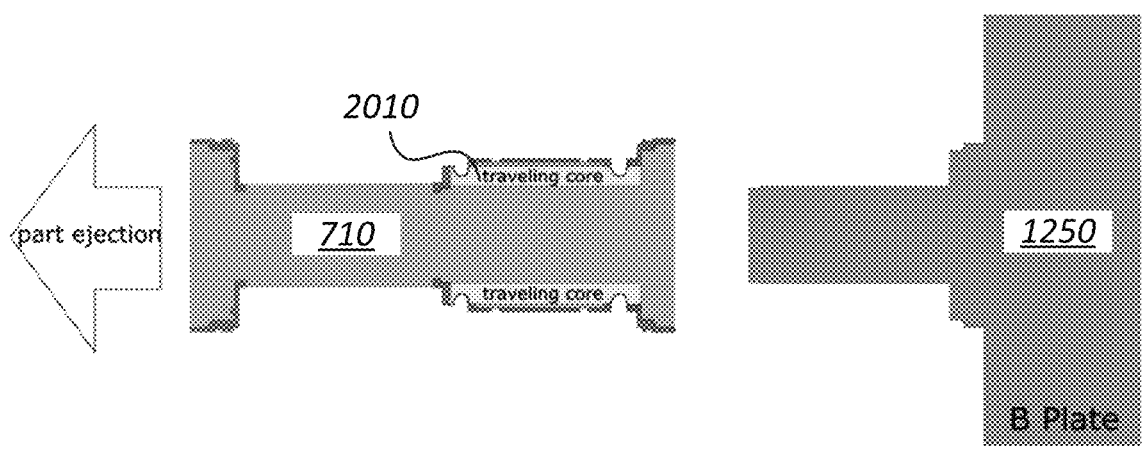
FIG. 21 shows aspects of removing a injection molding core for a speaker housing having a continuous unitized body construction using a travelling core, according to certain embodiments.
Figure 22:
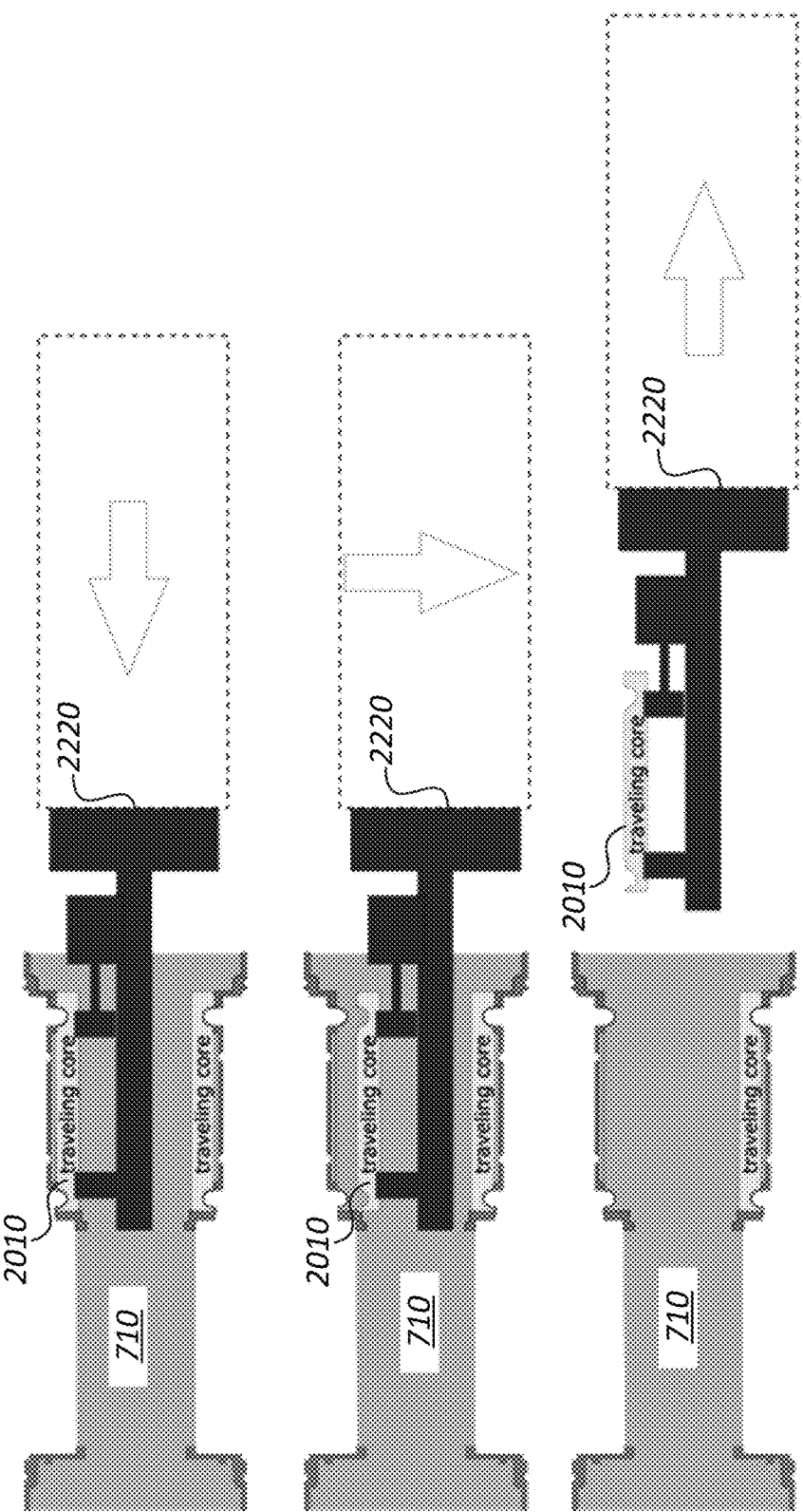
FIG. 22 shows aspects of removing a injection molding core for a speaker housing having a continuous unitized body construction using a travelling core, according to certain embodiments.

FIG. 20 shows aspects of removing a injection molding core for a speaker housing having a continuous unitized body construction using a travelling core, according to certain embodiments. In this implementation, a robot can extract a portion of plate 1250 with a traveling core (2010) still coupled to housing 710 (see, e.g., FIG. 21). The robot can then place housing 710 with traveling core 2010 in a secondary fixture 2220, which then extracts the traveling core(s), leaving the continuous, unit body (see, e.g., FIG. 22). Traveling cores can potentially allow more undercut than shown in FIGS. 17 and 18, however they are subject to similar limitations as collapsing cores, internal lifters, internal slides, and the like, in that they are only feasible when the inside dimensions of the molded part is large enough to avoid thin steel and tool breakage. For instance, the dimensions described above with respect to FIGS. 1-11 are too small and would be subject to frequent tool breakage. Further still, a robot end effector (or fixture) can also limit the thickness of a traveling core. Less travel can result in less required clearance and allow for thicker steel cores. It should be noted that the use of inverted surrounds can make traveling cores possible in smaller diameters because they would need less travel to clear (e.g., in some cases 1 mm of travel instead of 5 mm with conventional surrounds). This can allow the traveling core to be constructed more durably from thicker steel.

Figure 23:
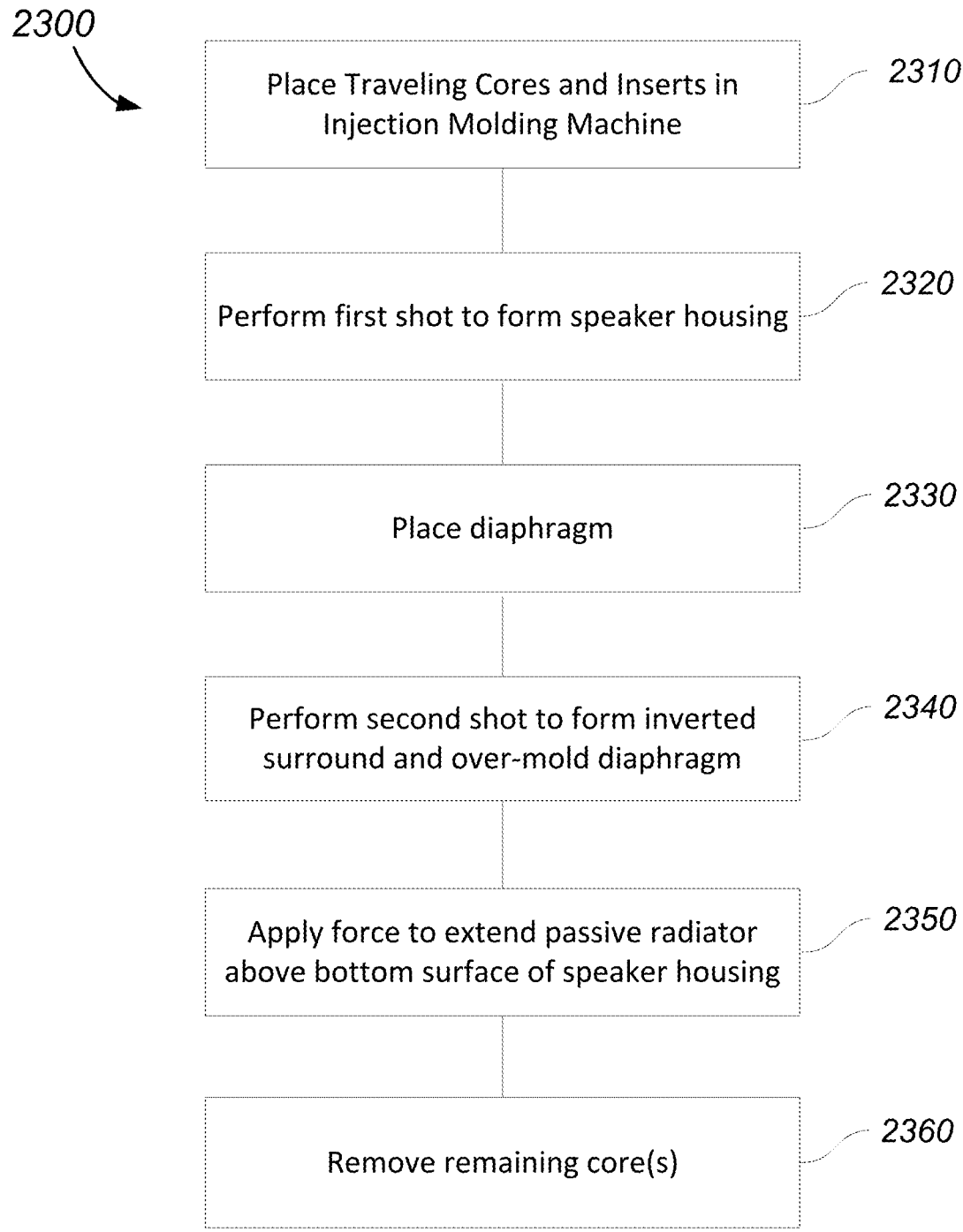
FIG. 23 shows a simplified flow diagram for a method of injection molding a speaker housing and passive radiator to form a continuous, unit body and removing the speaker housing from the core, according to certain embodiments.

FIG. 23 shows a simplified flow diagram for a method 2300 of injection molding a speaker housing and passive radiator to form a continuous, unit body and removing the speaker housing from the core, according to certain embodiments. Method 2300 can be performed by processing logic (e.g., a computer-implemented method) that may comprise hardware (circuitry, dedicated logic, etc.), software operating on appropriate hardware (such as a general purpose computing system or a dedicated machine), firmware (embedded software), or any combination thereof. In certain embodiments, method 2300 can be performed by a processor operating an injection molding machine (see, e.g., FIGS. 12-22).

At step 2310, method 2300 can include inserting plates (cores, traveling cores, etc.) (e.g., plates 1240, 1250) and inserts (e.g., slides 1260, 1265) in the injection molding machine 1200. The plates and slides can define the size, shape, and dimensions of the molded component.

At step 2320, method 2300 can include performing a first shot in the injection molding process, the first shot forming a hollow speaker housing 710 including an opening 712 formed on a surface of the speaker housing. The first shot may be comprised of a polycarbonate or other suitable material.

At step 2330, method 2300 can include placing a speaker diaphragm in opening 712 formed on the surface of speaker housing 710 after the first shot and before the second shot, where the speaker diaphragm is secured to the inner circumference 734 of the inverted speaker surround 730 by the second shot. Alternatively or additionally, a heavy material (e.g., tungsten-laden thermoplastic) can be employed such that no robotic loading is needed, or no still counterweight is loaded. In some embodiments, in-machine leak testing can be used to automatically detect holes and bonding failures using gas line/poppet configuration (see, e.g., FIGS. 20-22).

At step 2340, method 2300 can include configuring a second A Plate (1270) and second shot slides (1280, 1285) and performing a second shot in the injection molding process, the second shot forming an inverted speaker surround 730 including an inner circumference 734 and an outer circumference 732, such that speaker housing 710 and flexible speaker surround 730 form a continuous unitized body. The outer circumference can be coupled to an outer edge of the opening 712 of speaker housing 710. In some implementations, the second shot further over-molds the speaker diaphragm such that the diaphragm forms a portion of the continuous unitized body. The second shot may be comprised of LSR, TPU, natural rubber, or other suitable material. The shape and internal dimensions of the hollow speaker housing, the speaker opening, and the inverted speaker surround may be defined, in part, by a tooling plate core (plate 1250) and slides 1260 and 1280. In some cases, inverted speaker surround 730 may extend below a portion of a surface of the tooling plate core that defines the speaker housing, as shown in FIG. 16. Although flow chart 2300 refers to inner and outer circumferences, it should be noted that any shape for a passive (or other element—e.g., button) can be used. Thus, a more universal terms such as a "perimeter" can be used interchangeably with "circumference" throughout this disclosure with this understanding in mind.

At step 2350, method 2300 can include applying a force to cause the diaphragm and inverted speaker surround (i.e., passive radiator) to extend radially outward from the surface of the speaker housing such that the inverted speaker surround and the diaphragm are above a bottom surface of the speaker housing to clear undercut in the core, as shown in FIGS. 17-19. There are myriad ways of achieving this including latching on to the diaphragm via a vacuum attachment (or physical coupling via holes, bosses, etc.) and providing a pulling force to extend the diaphragm and inverted speaker surround above the bottom surface of the speaker housing. Alternatively or additionally, the passive radiator can be extended radially by applying a gas pressure from the tooling plate core (e.g., via gas lines and poppet valves, as shown in FIGS. 18-19) to provide a pushing force to extend the diaphragm and inverted speaker surround above the bottom surface of the speaker housing. Other methods can include travelling or collapsing cores (see, e.g., FIGS. 20-22), with the caveats described above. One of ordinary skill in the art with the benefit of this disclosure would understand the many variations, modifications, and alternative embodiments thereof. At step 2360, method 2300 can include removing the continuous, unitized body from the remaining core (plate 1250).

It should be appreciated that the specific steps illustrated in FIG. 23 provide a particular method 2300 for injection molding a speaker housing and passive radiator to form a continuous, unit body and removing the speaker housing from the core, according to certain embodiments. Other sequences of steps may also be performed according to alternative embodiments. For example, alternative embodiments may perform the steps outlined above in a different order. Moreover, the individual steps illustrated in FIG. 23 may include multiple sub-steps that may be performed in various sequences as appropriate to the individual step. For instance, some embodiments may employ a 3-shot process to mold the diaphragm out of plastic material instead of using an insert, as would be understood by one of ordinary skill in the art. Furthermore, additional steps may be added or removed depending on the particular applications. One of ordinary skill in the art would recognize and appreciate many variations, modifications, and alternatives of method 2300.

Figure 24:
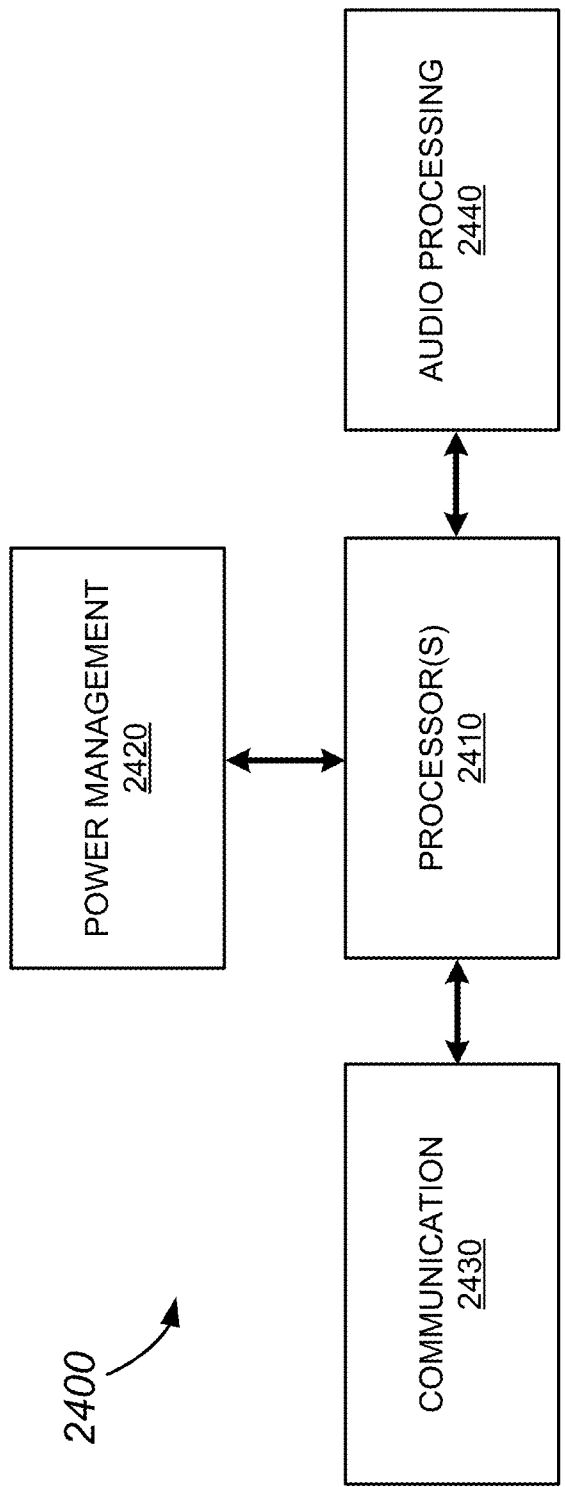
FIG. 24 shows a simplified block diagram of a system for operating a mobile audio device, according to certain embodiments.

FIG. 24 show a simplified block diagram of a system 2400 for operating a mobile audio device (e.g., 100), according to certain embodiments. System 2400 includes one or more processors 2410, a power management block 2420, a communication block 2430, and an audio processing block 2440. Each of the system blocks 2420-2440 can be in electrical communication with processor 2410. System 2400 may further include additional systems (e.g., memory blocks, touch screen input/outputs, etc.) that are not shown or discussed to prevent obfuscation of the novel features described herein. Similarly, system 2400 may include fewer systems (e.g., no power management block 2420, etc.) as required by design.

In certain embodiments, processor 2410 includes one or more microprocessors (μCs) and is configured to control the operation of system 2400. Alternatively, processor 2410 may include one or more microcontrollers (MCUs), digital signal processors (DSPs), or the like, with supporting hardware/firmware (e.g., memory, programmable I/Os, etc.), as would be appreciated by one of ordinary skill in the art. Processor 2410 can be configured to control the operation of the speakerphone base systems described herein.

Power management block 2420 can be configured to manage power distribution, recharge batteries, manage power efficiency, and the like, according to certain embodiments of the invention. For example, power management block 2420 can control battery charging and charge distribution. System 2400 can be powered by batteries, rechargeable batteries, accumulator(s), renewable power sources (e.g., photovoltaic panels), an AC adaptor, universal serial bus (USB), or other suitable power source. Controls 170 may include a power button, a wireless connect initiation button (e.g., Bluetooth button), an AC jack, volume controls (140) or the like.

Communication block 2430 can be controlled by processor 2410 and configured to control data communication between a mobile audio device 100 and a host computing device, according to certain embodiments. In some cases, communication block 2430 can be configured to send and receive audio data from audio device 100 via wireless communication. For example, a wide variety of wireless communication protocols can be used including, but not limited to, Bluetooth, BLE, Z-Wave, ZigBee, Wi-Fi, Near Field Communication (NFC), infra-red (IR) systems, or other standard or proprietary wireless network communication protocol. Other embodiments of the invention may utilize different types of cables, harnesses, or connection protocol standards to effectuate a hardwired communication with outside entities (e.g., mobile input device 100). In some cases, a USB cable can be used to provide power to system 2400 (i.e., recharge batteries) and simultaneously support data communication between mobile audio device 100 and a host computing device (e.g., smart phone, lap top computer, etc.).

Audio processing block ("audio block") 2440 controls audio playback of audio data (e.g., voice data, music data, etc.) received from audio device 100, according to certain embodiments. Audio block 2440 may drive one or more speakers (e.g., passive radiators, active drivers, etc.) disposed under speaker housing/grille 110. Audio block 2440 can further control standard audio interfacing controls for input device 100 including volume (140), mute, connect 150, and the like. It should be noted that the embodiments described herein are not exhaustive any configuration or arrangement of speakers, buttons, or the like, can be implemented as needed. Each of the system blocks 2420-2440 can be in electrical communication with processor 2410. System 2400 may further include additional systems that are not shown or discussed to prevent obfuscation of the novel features described herein. The system blocks described herein can be implemented in whole or in part to any of the embodiments described herein.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A portable speaker apparatus comprising:
   a speaker housing having a surface, the speaker housing including an opening formed on the surface of the speaker housing;
   a flexible surround including an inner circumference and an outer circumference, the outer circumference coupled to an outer edge of the opening of the speaker housing; and
   a diaphragm coupled to the inner circumference of the flexible surround such that the diaphragm is suspended within the opening of the speaker housing,
   wherein the flexible surround and diaphragm form a speaker passive, and
   wherein the speaker housing and the flexible surround form an integrated, continuous, and unitized body formed via a multi-shot injection molding process such that there are no seams between the speaker housing and the flexible surround, and the diaphragm is coupled to the inner circumference of the flexible surround via an over-molding process.

2. The portable speaker apparatus of claim 1 wherein the flexible surround is an inverted surround.

3. The portable speaker apparatus of claim 1 wherein the flexible surround is comprised of liquid silicone rubber (LSR) or thermoplastic polyurethane (TPU).

4. The portable speaker apparatus of claim 1 wherein the speaker housing is comprised of a polycarbonate.

5. The portable speaker apparatus of claim 1 wherein the integrated, continuous, and unitized body is injection molded in a multi-shot process, wherein a first shot of the multi-shot process forms the speaker housing, and wherein a second shot of the multi-shot process forms the flexible surround and over-molds the diaphragm, such that the diaphragm is part of the integrated, continuous, and unitized body.

6. The portable speaker apparatus of claim 1 wherein the housing is formed in one of a cylindrical shape, rectangular shape, square shape, oval shape, pill shape, saucer shape, or spherical shape.

* * * * *